(12) United States Patent
Satou et al.

(10) Patent No.: US 10,317,263 B2
(45) Date of Patent: *Jun. 11, 2019

(54) FLOWMETER HAVING A FLOW MEASURING UNIT AND A FLOW PASSAGE MEMBER IN A SINGLE HOUSING

(71) Applicant: Panasonic Intellectual Property Management Co., Ltd., Osaka (JP)

(72) Inventors: Masato Satou, Nara (JP); Masanobu Teraji, Nara (JP); Hidetomo Nagahara, Kyoto (JP); Hideaki Morihana, Nara (JP); Naoto Naganuma, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 174 days.

This patent is subject to a terminal disclaimer.

(21) Appl. No.: 15/112,182

(22) PCT Filed: Jan. 22, 2015

(86) PCT No.: PCT/JP2015/000277
§ 371 (c)(1),
(2) Date: Jul. 17, 2016

(87) PCT Pub. No.: WO2015/118823
PCT Pub. Date: Aug. 13, 2015

(65) Prior Publication Data
US 2016/0370215 A1    Dec. 22, 2016

(30) Foreign Application Priority Data

Feb. 7, 2014  (JP) .................................. 2014-021954

(51) Int. Cl.
*G01F 1/66* (2006.01)
*G01F 15/14* (2006.01)
*G01F 15/18* (2006.01)

(52) U.S. Cl.
CPC ................ *G01F 1/662* (2013.01); *G01F 1/66* (2013.01); *G01F 15/14* (2013.01); *G01F 15/18* (2013.01); *G01F 15/185* (2013.01)

(58) Field of Classification Search
CPC .......... G01N 1/662; G01N 1/66; G01N 15/14; G01N 15/18; G01N 15/185; G01F 1/662;
(Continued)

(56) References Cited

FOREIGN PATENT DOCUMENTS

| EP | 0 987 526 A2 | 3/2000 |
|---|---|---|
| JP | 59-170722 | 9/1984 |

(Continued)

OTHER PUBLICATIONS

Extended Search Report in corresponding European Application No. 15745803.5, dated Feb. 1, 2017, 9 pages.
(Continued)

*Primary Examiner* — Justin N Olamit
(74) *Attorney, Agent, or Firm* — Brinks Gilson & Lione

(57) ABSTRACT

A gas flowmeter includes: a device body which air-tightly accommodates a fluid to be measured; an inlet pipe through which the fluid to be measured is made to flow into the device body; and an outlet pipe through which the fluid to be measured is made to flow out from the device body. The gas flowmeter further includes: an ultrasonic flow rate measuring unit which is connected to the outlet pipe and measures a flow rate of the fluid to be measured which flows in the ultrasonic flow rate measuring unit; a connecting pipe which is connected to the outlet pipe; and a flow passage member which is connected to the connecting pipe and has a flow passage shape identical to a shape of the ultrasonic flow rate (Continued)

measuring unit. The gas flowmeter is provided with a support member which fixes the ultrasonic flow rate measuring unit and the flow passage member to each other. With such a configuration, a gas flow meter capable of performing stable flow rate measurement can be implemented.

11 Claims, 33 Drawing Sheets

(58) Field of Classification Search
CPC . G01F 1/66; G01F 15/14; G01F 15/18; G01F 15/185
See application file for complete search history.

(56) References Cited

FOREIGN PATENT DOCUMENTS

| | | | |
|---|---|---|---|
| JP | 09005133 A | * | 1/1997 |
| JP | 10-111155 | | 4/1998 |
| JP | 11-287688 | | 10/1999 |
| JP | 2000-241219 | | 9/2000 |
| JP | 2012-163518 | | 8/2012 |
| WO | 2012/169201 | | 12/2012 |

OTHER PUBLICATIONS

International Search Report of PCT application No. PCT/JP2015/000277 dated Feb. 24, 2015.

* cited by examiner

FLOWMETER HAVING A FLOW MEASURING UNIT AND A FLOW PASSAGE MEMBER IN A SINGLE HOUSING

TECHNICAL FIELD

The present invention relates to a gas flowmeter for measuring a flow rate of a gas by propagating an ultrasonic wave through the gas.

BACKGROUND ART

A gas flowmeter measures a flow rate of a gas by making use of a phenomenon that, for example, a propagation time or a propagation speed of an ultrasonic wave changes in accordance with a flow speed of a gas (fluid). That is, the gas flowmeter measures a flow rate of a gas by propagating an ultrasonic wave through a gas which flows in a measuring tube provided in the course of a flow passage (see PTL 1, for example).

Hereinafter, the configuration of a gas flowmeter described in PTL 1 is described with reference to FIG. 33. FIG. 33 is a view for describing a conventional gas flowmeter.

As shown in FIG. 33, the conventional gas flowmeter is configured by device body 81, ultrasonic flow rate measuring unit 88 housed in device body 81 and the like. Device body 81 is configured by upper case 82 and lower case 83 which are formed by performing press working on metal. Inlet pipe 84 and outlet pipe 85 are disposed on upper case 82. Inlet pipe 84 opens in the inside of device body 1 through cut-off valve 86. Ultrasonic flow rate measuring unit 88 is connected to outlet pipe 85 through connecting pipe 87 thus forming an L shape.

However, in the conventional gas flowmeter, outlet pipe 85 supports ultrasonic flow rate measuring unit 88 in a cantilever manner. Accordingly, ultrasonic flow rate measuring unit 88 is supported in an unstable state. Particularly, outlet pipe 85 supports ultrasonic flow rate measuring unit 88 substantially horizontally by way of connecting pipe 87. Accordingly, a moment applied to outlet pipe 85 becomes large thus making the supporting of ultrasonic flow rate measuring unit 88 more unstable. Accordingly, ultrasonic flow rate measuring unit 88 easily swings. As a result, there exists a drawback that the stable flow rate measurement cannot be performed due to such swinging of ultrasonic flow rate measuring unit 88.

To overcome the above drawback, the configuration may be considered where connecting pipe 87 and ultrasonic flow rate measuring unit 88 are fixed to device body 81 by bolts. In this case, device body 81 is formed by performing press working on metal and hence, it is necessary to make the bolts for fixing penetrate device body 81. Accordingly, it is necessary to provide a sealing material for preventing leakage of a gas through between the bolt and a periphery of a hole formed in device body 81.

However, usually, durability of the sealing material is low compared to a life of the gas flowmeter. Accordingly, there is a drawback that leakage of a gas occurs through a gap formed between the bolt and the periphery of the hole formed in device body 81 when the sealing material is peeled off.

Further, particularly in the case of a gas flowmeter for business use, it is necessary to make a gas flow through the gas flowmeter at a large flow rate. Accordingly, usually, an ultrasonic flow rate measuring unit and a flow passage member having the same flow passage configuration as the ultrasonic flow rate measuring unit are connected to a connecting pipe. That is, in the case of the gas flowmeter for business use, the plurality of members (the ultrasonic measuring unit and the flow passage member) are connected to one connecting pipe for measuring a large flow rate of gas. Accordingly, a weight load is increased so that a moment is further increased. Accordingly, the supporting of the ultrasonic flow rate measuring unit becomes more unstable. As a result, there is a drawback that stable flow rate measurement cannot be performed.

CITATION LIST

Patent Literature

PTL 1: Unexamined Japanese Patent Publication No. 2012-163518

SUMMARY OF THE INVENTION

It is an object of the present invention to provide a gas flowmeter having an ultrasonic flow rate measuring unit and a flow passage member and capable of performing stable flow rate measurement.

That is, a gas flowmeter according to the present invention includes: a device body which air-tightly accommodates a fluid to be measured; an inlet pipe through which the fluid to be measured is made to flow into the device body; an outlet pipe through which the fluid to be measured is made to flow out from the device body; and a connecting pipe which is connected to the outlet pipe. The gas flowmeter further includes an ultrasonic flow rate measuring unit which is connected to the connecting pipe and measures a flow rate of the fluid to be measured which flows in the ultrasonic flow rate measuring unit, and a flow passage member which is connected to the connecting pipe and has a flow passage shape identical to a shape of the ultrasonic flow rate measuring unit. The gas flowmeter is provided with a support member by which the ultrasonic flow rate measuring unit and the flow passage member are joined to each other.

With such a configuration, the ultrasonic flow rate measuring unit and the flow passage member are joined to each other by the support member and hence, vibrations of the ultrasonic flow rate measuring unit can be suppressed. As a result, it is possible to implement an ultrasonic flow rate measuring unit having enhanced accuracy in measuring a flow rate of a fluid to be measured.

DESCRIPTION OF EMBODIMENTS

Hereinafter, exemplary embodiments of the present invention are described with reference to the drawings. The present invention is not limited to these exemplary embodiments.

First Exemplary Embodiment

Hereinafter, the configuration of a gas flowmeter according to a first exemplary embodiment of the present invention is described with reference to FIG. 1 to FIG. 6.

Figure 1:
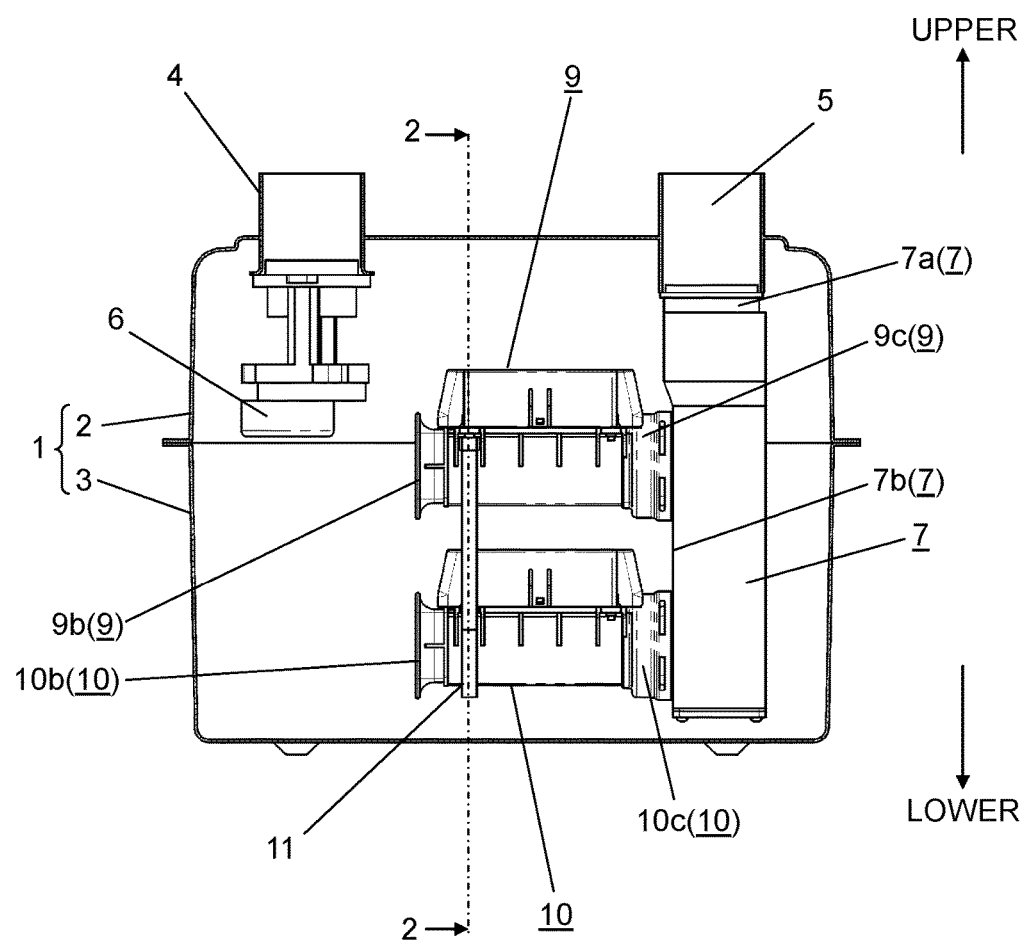
FIG. 1 is a view for describing a gas flowmeter according to a first exemplary embodiment of the present invention.
Figure 2:
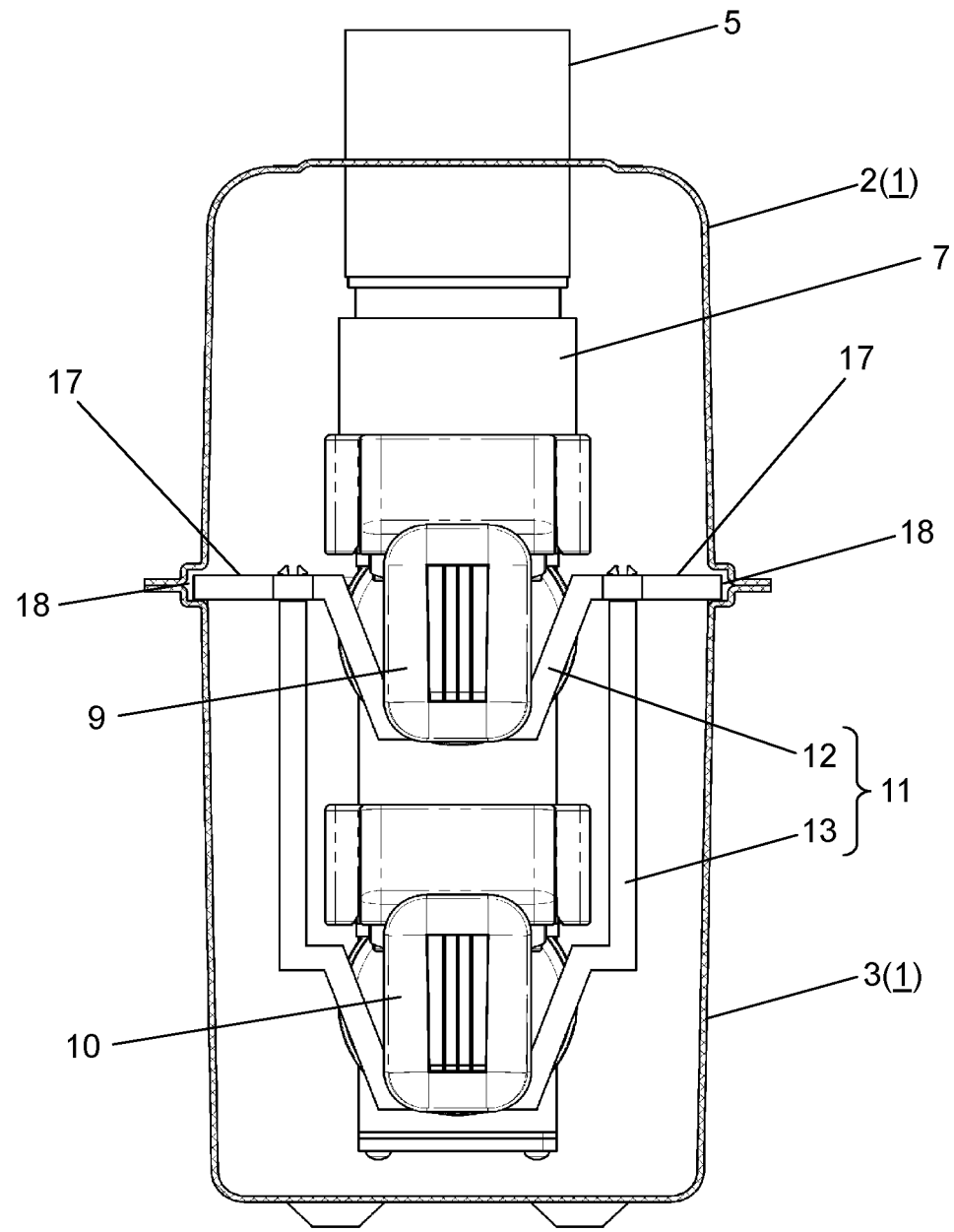
FIG. 2 is a cross-sectional view taken along line 2-2 in FIG. 1.
Figure 3:
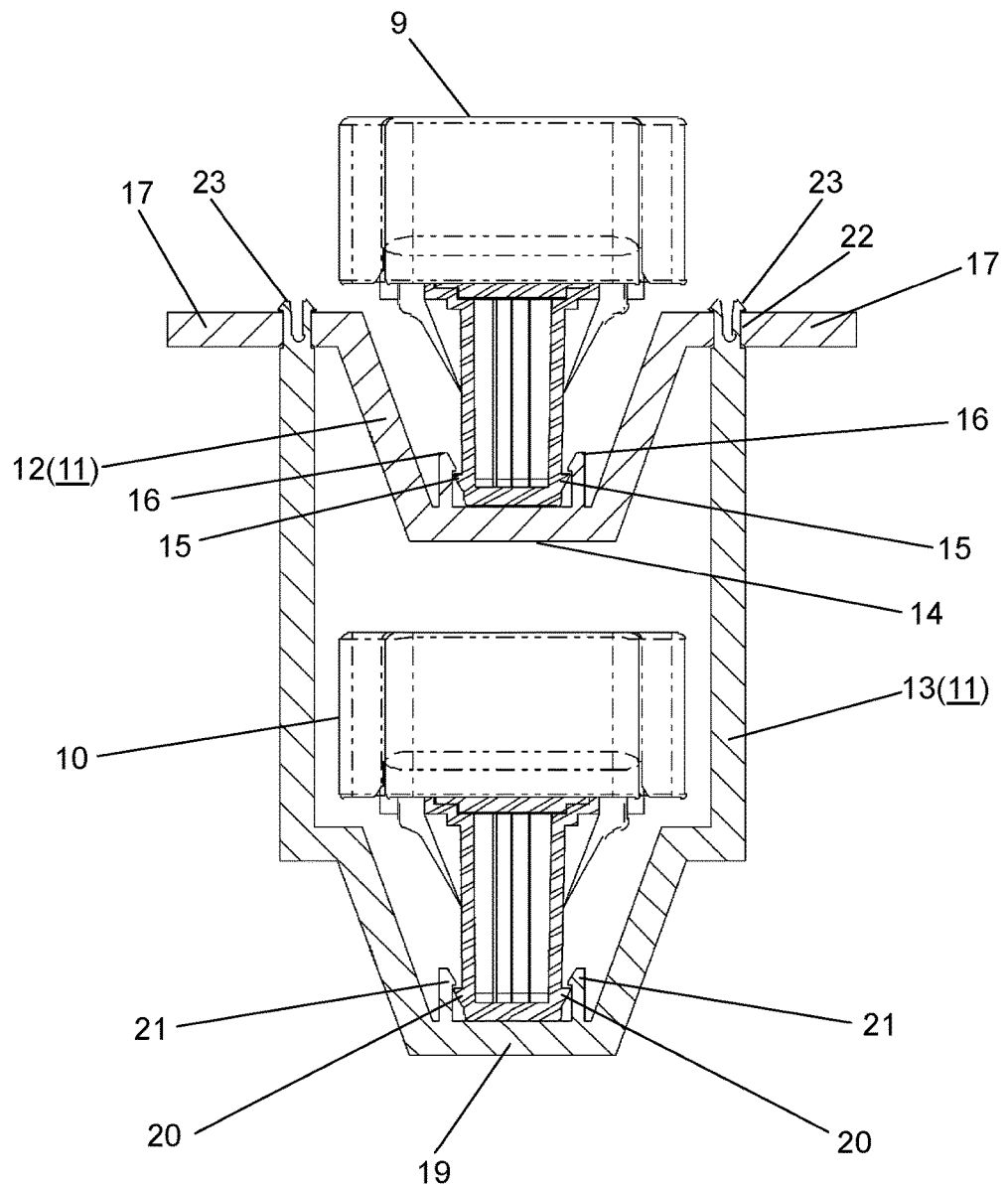
FIG. 3 is an enlarged cross-sectional view of a main part of the gas flowmeter.
Figure 4:
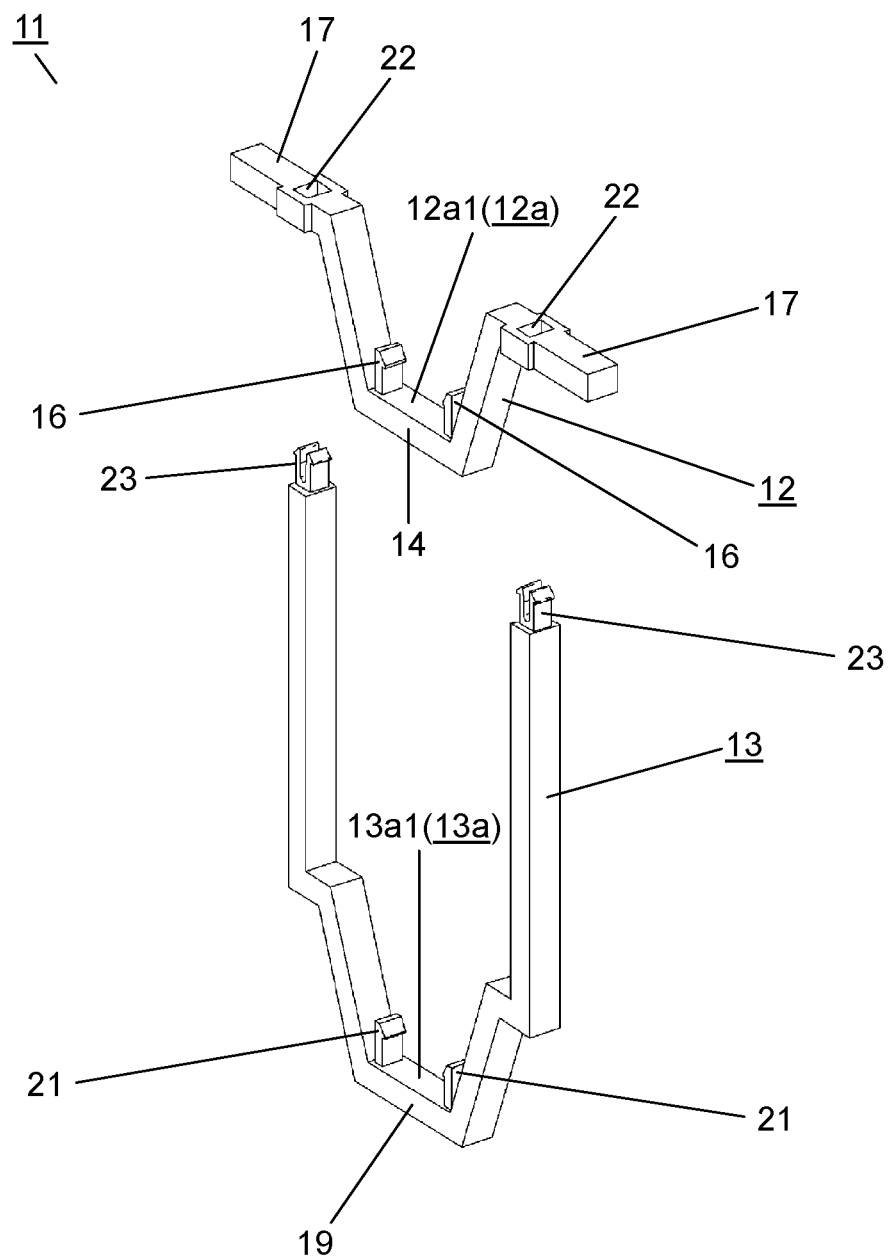
FIG. 4 is an exploded perspective view of a support member in the gas flowmeter.
Figure 5:
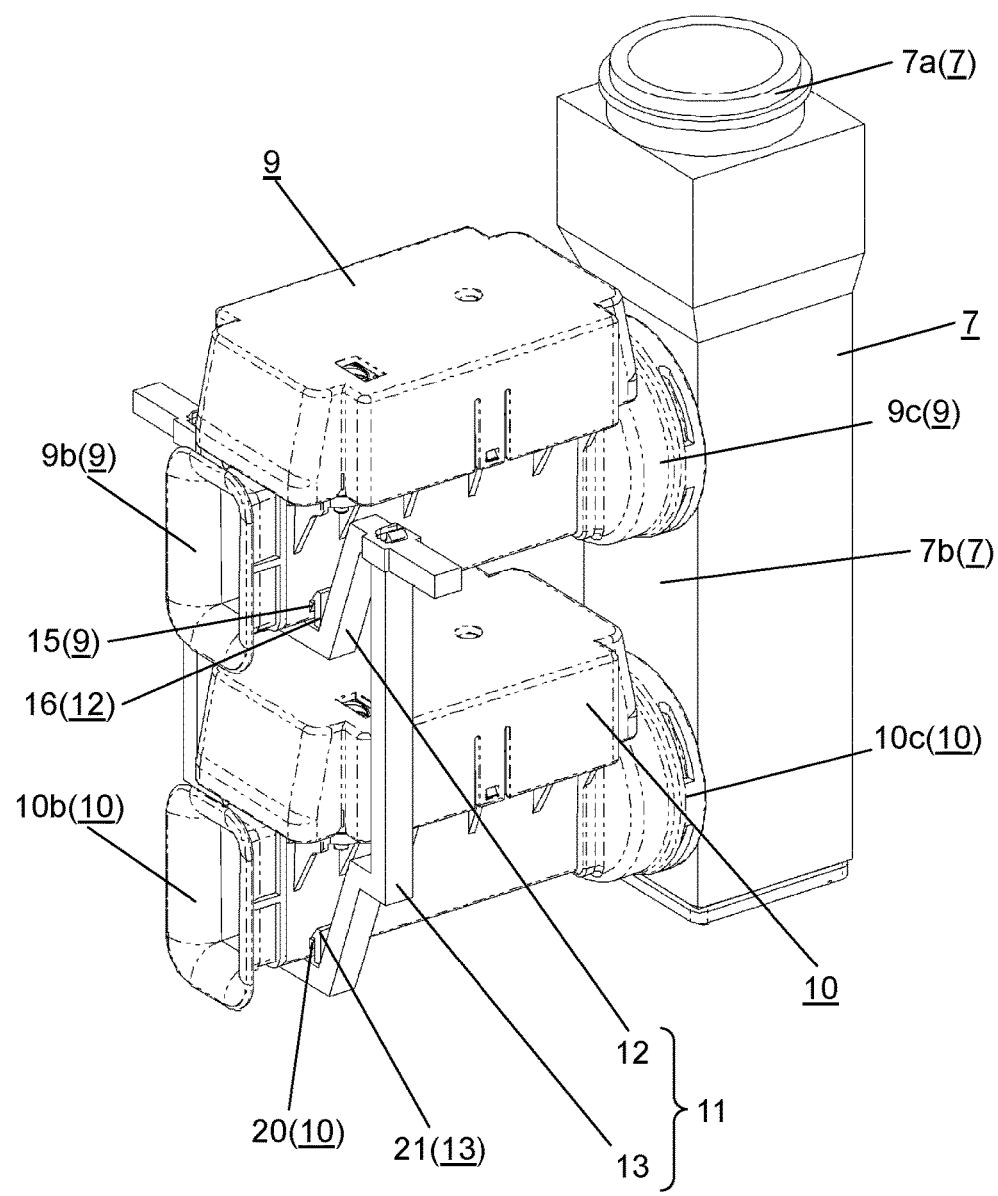
FIG. 5 is a perspective view of the main part of the gas flowmeter.
Figure 6:
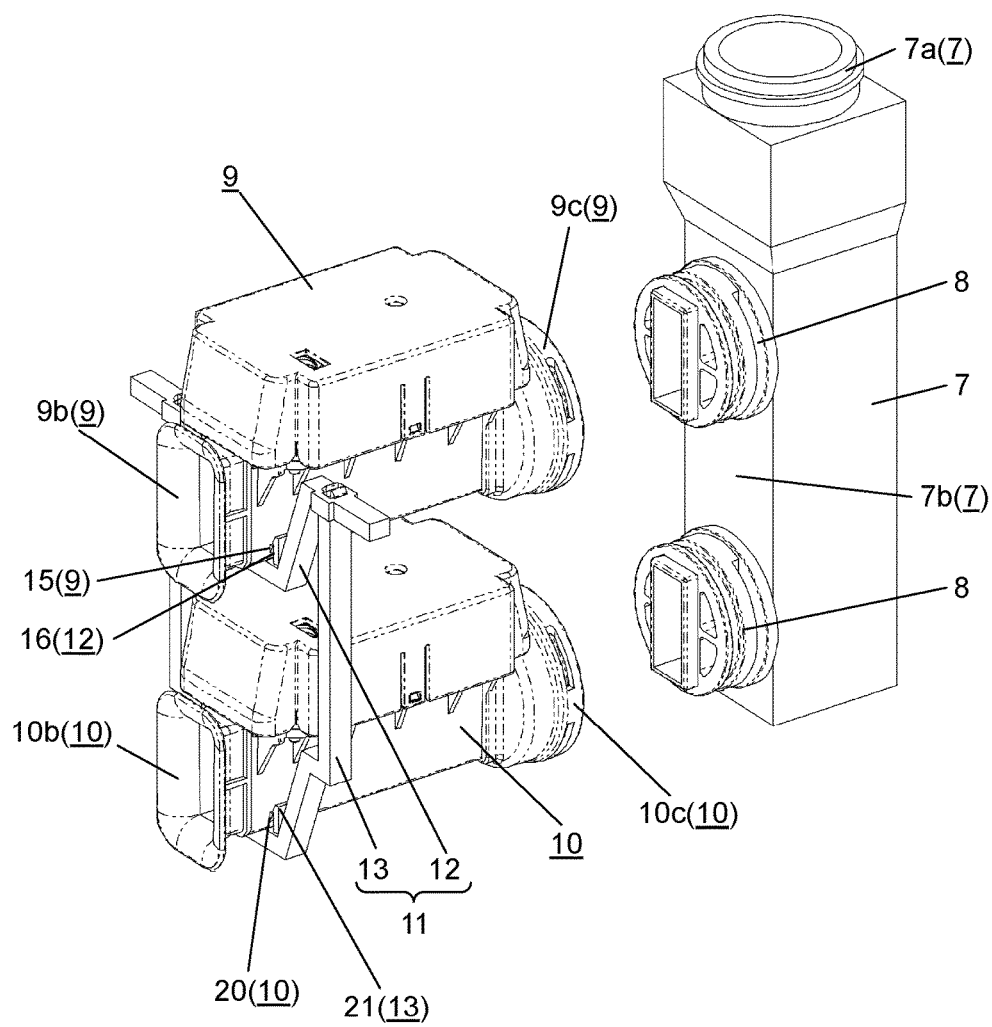
FIG. 6 is an exploded perspective view of the main part of the gas flowmeter.

FIG. 1 is a view for describing a gas flowmeter according to the first exemplary embodiment of the present invention. FIG. 2 is a cross-sectional view taken along line 2-2 in FIG. 1. FIG. 3 is an enlarged cross-sectional view of a main part of the gas flowmeter. FIG. 4 is an exploded perspective view of a support member in the gas flowmeter. FIG. 5 is a perspective view of the main part of the gas flowmeter. FIG. 6 is an exploded perspective view of the main part of the gas flowmeter.

As shown in FIG. 1 and FIG. 2, the gas flowmeter of this exemplary embodiment is configured by device body 1 which includes upper case 2 and lower case 3. Upper case 2 and lower case 3 are formed by performing press working on metal, for example. Inlet pipe 4 into which a fluid to be measured such as a gas, for example, flows in and outlet pipe 5 through which the fluid to be measured flows out are disposed on an upper surface of upper case 2. Inlet pipe 4 opens in the inside of device body 1 through cur-off valve 6. Outlet pipe 5 is connected to connecting pipe 7 in the inside of device body 1.

As shown in FIG. 6, two mounting portions 8 are formed on side surface 7b of connecting pipe 7 on an upper side and a lower side in a vertical direction (also referred to as "longitudinal direction"). That is, "longitudinal direction" means a longitudinal direction of connecting pipe 7 shown in FIG. 6 or a direction along the direction that connecting pipe 7 is connected to outlet pipe 5.

Ultrasonic flow rate measuring unit 9 is connected to upper mounting portion 8, and flow passage member 10 is connected to lower mounting portion 8. Further, as shown in FIG. 5, ultrasonic flow rate measuring unit 9 and flow passage member 10 are fixed to upper and lower mounting portions 8 by fixing fittings (not shown in the drawing). In such a configuration, ultrasonic flow rate measuring unit 9 and flow passage member 10 are connected to side surface 7b of connecting pipe 7 such that ultrasonic flow rate measuring unit 9 and flow passage member 10 are arranged in a direction orthogonal to side surface 7b of connecting pipe 7 thus forming an L-shape, for example.

The vertical direction and the like indicated above are described for the sake of convenience by taking a case where the parts are arranged in a state shown in FIG. 1 as an example. Accordingly, with respect to the installation direction of the parts, it is needless to say that, when the parts are arranged upside down or are arranged in a horizontal direction, the vertical direction and the like are determined corresponding to such arrangement. The same goes for exemplified embodiments described hereinafter.

In this embodiment, flow passage member 10 is configured to have a flow passage shape identical to a shape of ultrasonic flow rate measuring unit 9. To be more specific, flow passage member 10 is configured by ultrasonic flow rate measuring unit or the like from which a mechanism for measuring a flow rate is eliminated, for example. However, it is needless to say that flow passage member 10 is not limited to such a configuration.

That is, in this exemplary embodiment, ultrasonic flow rate measuring unit 9 and flow passage member 10 having the identical flow passage shape are connected to mounting portions 8 of connecting pipe 7. With such a configuration, a flow rate of a fluid which flows through ultrasonic flow rate measuring unit 9 and a flow rate of a fluid which flows through flow passage member 10 can be set substantially equal (including "equal") to each other. Accordingly, by providing a plurality of mounting portions 8 and by mounting ultrasonic flow rate measuring unit 9 and flow passage member 10 having the identical flow passage shape on mounting portions 8, it is possible to easily cope with an increase of a flow rate of a fluid to be measured by the gas flowmeter. As a result, also in a case of using a gas flowmeter of a large flow rate, it is possible to maintain high measuring accuracy of ultrasonic flow rate measuring unit 9.

In the above embodiment, the description has been made with respect to the example where ultrasonic flow rate measuring unit 9 is connected to upper mounting portion 8 and flow passage member 10 is connected to lower mounting portion 8. However, the present invention is not limited to such a configuration. For example, flow passage member 10 may be connected to upper mounting portion 8, and ultrasonic flow rate measuring unit 9 may be connected to lower mounting portion 8. Further, ultrasonic flow rate measuring unit 9 having a mechanism for measuring a flow rate may be connected to both upper and lower mounting portions 8. In this case, a measured signal of one ultrasonic flow rate measuring unit 9 may be used for measuring a flow rate of a fluid to be measured, and the other ultrasonic flow rate measuring unit may be used as flow passage member 10 without being used for measuring a flow rate. Further, both ultrasonic flow rate measuring units 9 may be used for measuring a flow rate of a fluid to be measured.

Ultrasonic flow rate measuring unit 9 and flow passage member 10 are connected to each other by support member 11 at positions in the vicinity of inflow ports 9b, 10b disposed away from connecting pipe 7. With such a configuration, ultrasonic flow rate measuring unit 9 and flow passage member 10 are integrally supported by support member 11. In such a configuration, support member 11 is configured by upper support member 12 and lower support member 13. Upper support member 12 supports ultrasonic flow rate measuring unit 9 positioned on an upper side of connecting pipe 7. Lower support member 13 supports flow passage member 10 positioned on a lower side of connecting pipe 7.

As shown in FIG. 3 and FIG. 4, upper support member 12 includes recessed portion 12a having an inverted trapezoidal shape at a center portion thereof, and includes fixing portion 14 for fixing ultrasonic flow rate measuring unit 9 on upper surface 12a1 of a bottom side of recessed portion 12a thereof. Locking pawls 16 are formed on fixing portion 14. As shown in FIG. 3, locking pawls 16 engage with locking projections 15 formed on outer side surfaces of a lower portion of ultrasonic flow rate measuring unit 9 so as to fix ultrasonic flow rate measuring unit 9 to upper support member 12.

Upper support member 12 includes support arms 17 extending outward on both sides of recessed portion 12a on an open end. Support arms 17 are positioned and held by holding portions 18 formed by contact portions where upper case 2 and lower case 3 are brought into contact with each other as shown in FIG. 1 and FIG. 2. Holding portions 18 are formed only at positions corresponding to support arms 17, and stably hold support arms 17 in a sandwiching manner.

Lower support member 13 is formed into an approximately U shape (including "U shape"), and includes recessed portion 13a having an inverted trapezoidal shape, for example, at a center portion of lower support member 13 in the same manner as upper support member 12. Fixing portion 19 for fixing flow passage member 10 is provided on upper surface 13a1 of a bottom side of recessed portion 13a of lower support member 13. Locking pawls 21 are trapezoidal formed on fixing portion 19. As shown in FIG. 3, locking pawls 21 engage with locking projections 20 formed on side surfaces of a lower portion of flow passage member 10 so as to fix flow passage member 10 to lower support member 13. Further, engaging pawls 23 are formed on upper portions of both ends of lower support member 13. Engaging pawls 23 engage with engaging holes 22 formed in support arms 17 of upper support member 12. With such a configuration, support member 11 is configured by upper support member 12 and lower support member 13.

The gas flowmeter of this exemplary embodiment is configured as described above.

The method for forming the gas flowmeter according to this exemplary embodiment is described hereinafter.

Firstly, as shown in FIG. 1 to FIG. 6, locking projections 15 formed on the outer side surfaces of the lower portion of ultrasonic flow rate measuring unit 9 are locked to locking pawls 16 formed on fixing portion 14 of upper support member 12. With such an operation, ultrasonic flow rate measuring unit 9 is fixed to upper support member 12.

Next, locking projection 20 of flow passage member 10 is locked to locking pawl 21 formed on fixing portion 19 of lower support member 13. With such an operation, flow passage member 10 is fixed to lower support member 13.

Then, engaging pawls 23 of lower support member 13 to which flow passage member 10 is fixed are engaged with engaging holes 22 formed in support arms 17 of upper support member 12 to which ultrasonic flow rate measuring unit 9 is fixed.

Next, in the above state, outflow port 9c of ultrasonic flow rate measuring unit 9 and outflow port 10c of flow passage member 10 are connected to corresponding mounting portions 8 of connecting pipe 7, and are fixed by fixing fittings (not shown in the drawing). Fixing of ultrasonic flow rate measuring unit 9 and flow passage member 10 to mounting portions 8 may be performed using engaging pawls or the like. With such a configuration, fixing fittings can be eliminated. As a result, assembling operability is enhanced and hence, a gas flowmeter can be configured at a lower cost.

In the above state, connecting pipe 7, ultrasonic flow rate measuring unit 9, flow passage member 10 and support member 11 are integrally formed with each other. Accordingly, the above configuration can be handled as one unit. As a result, handling of these parts is enhanced and hence, operability in assembling these parts to device body 1 is enhanced.

Next, upper case 2 is reversed so as to assemble connecting pipe 7, ultrasonic flow rate measuring unit 9, flow passage member 10 and the like which are formed into a unit into device body 1.

Next, connecting portion 7a of connecting pipe 7 is connected to outlet pipe 5 fixed to upper case 2. Then, support arms 17 of support members 11 are temporarily held by holding portions 18 of upper case 2.

Then, upper case 2 is covered by lower case 3, and peripheries of upper case 2 and lower case 3 are air-tightly sealed by way of the sealing member, for example.

That is, in the gas flowmeter according to this exemplary embodiment, outflow port 9c of ultrasonic flow rate measuring unit 9 and outflow port 10c of flow passage member 10 are fixed to mounting portions 8 of connecting pipe 7. Further, a portion of ultrasonic flow rate measuring unit 9 in the vicinity of inflow port 9b is supported on holding portion 18 of device body 1 by support member 11. With such a configuration, ultrasonic flow rate measuring unit 9 and flow passage member 10 are stably supported and fixed in device body 1. As a result, the gas flowmeter can perform stable flow rate measurement by suppressing swinging of ultrasonic flow rate measuring unit 9.

Further, with the above configuration, even when vibrations are generated during transportation of a gas flowmeter or the like, large swinging of ultrasonic flow rate measuring unit 9 and flow passage member 10 can be suppressed. Accordingly, the deformation or the like in a connecting portion between outlet pipe 5 and upper case 2 can be suppressed. As a result, it is possible to suppress the deterioration of sealing property at the connecting portion between outlet pipe 5 and upper case 2 more effectively and hence, high reliability can be maintained.

In the above exemplary embodiment, the description has been made with respect to the example where ultrasonic flow rate measuring unit 9 and flow passage member 10 are connected to connecting pipe 7 in a state where ultrasonic flow rate measuring unit 9 and flow passage member 10 are supported by support member 11. However, the present invention is not limited to such a configuration. For example, the configuration may be adopted where ultrasonic flow rate measuring unit 9 and flow passage member 10 are supported by support member 11 after ultrasonic flow rate measuring unit 9 and flow passage member 10 are connected to connecting pipe 7.

Second Exemplary Embodiment

Hereinafter, the configuration of a gas flowmeter of a second exemplary embodiment of the present invention is described with reference to FIG. 7 to FIG. 10. Parts having an identical configuration with the corresponding parts of the first exemplary embodiment are given the same symbols and the description of these parts is omitted.

Figure 7:
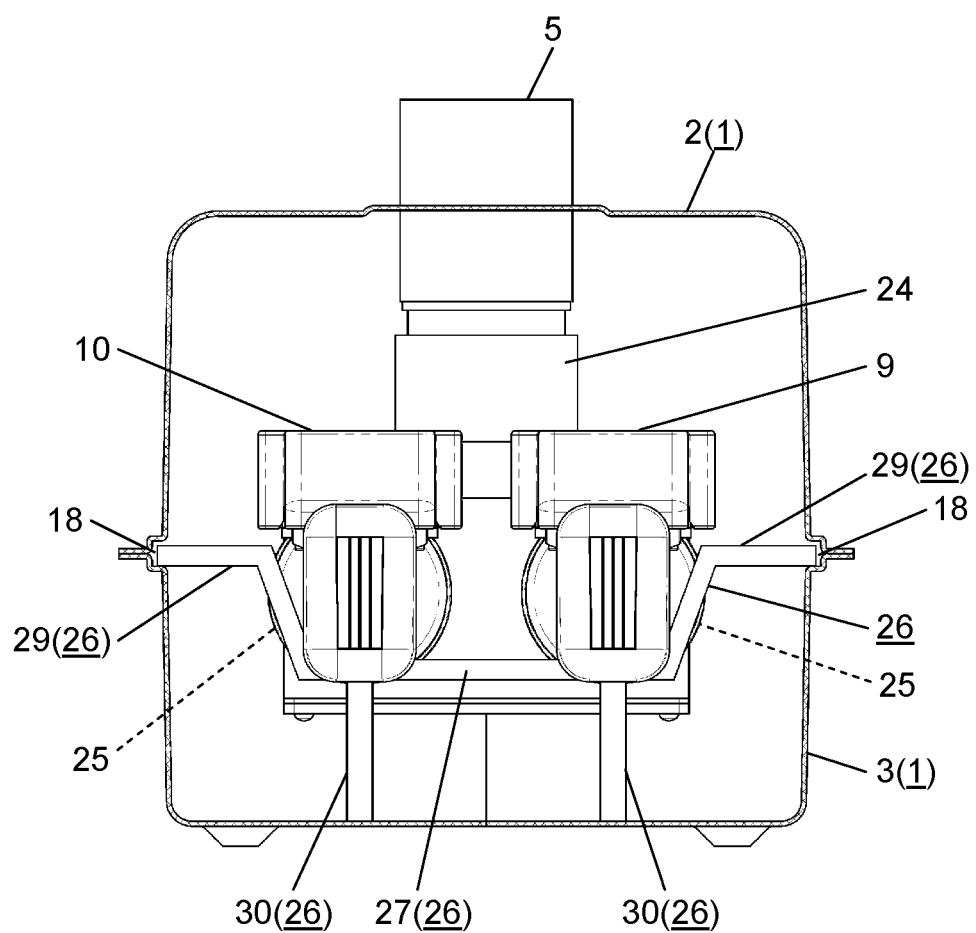
FIG. 7 is a view for describing a gas flowmeter according to a second exemplary embodiment of the present invention.
Figure 8:
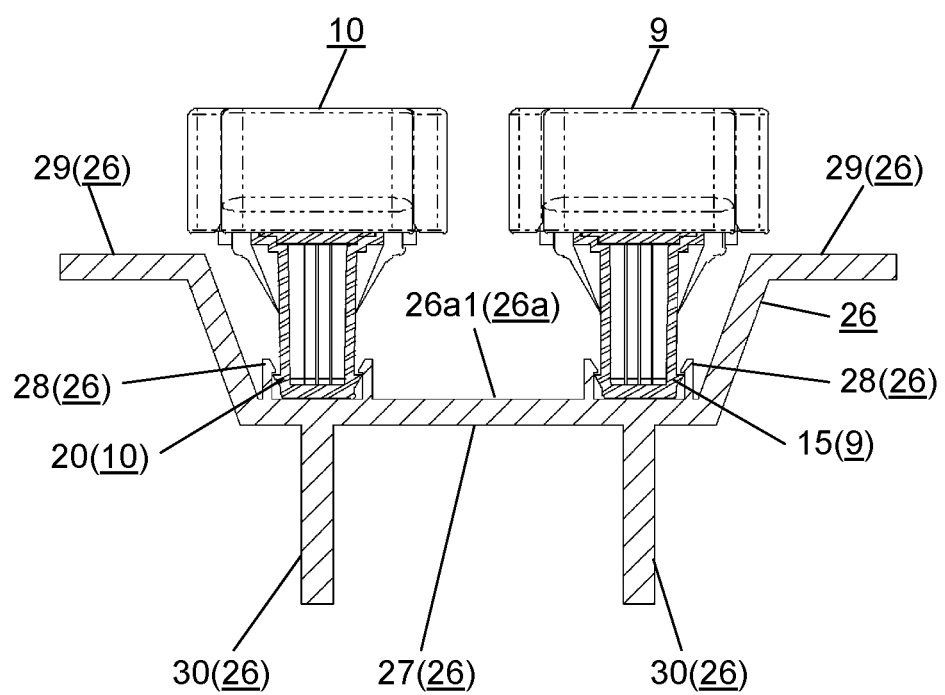
FIG. 8 is an enlarged cross-sectional view of a main part of the gas flowmeter.
Figure 9:
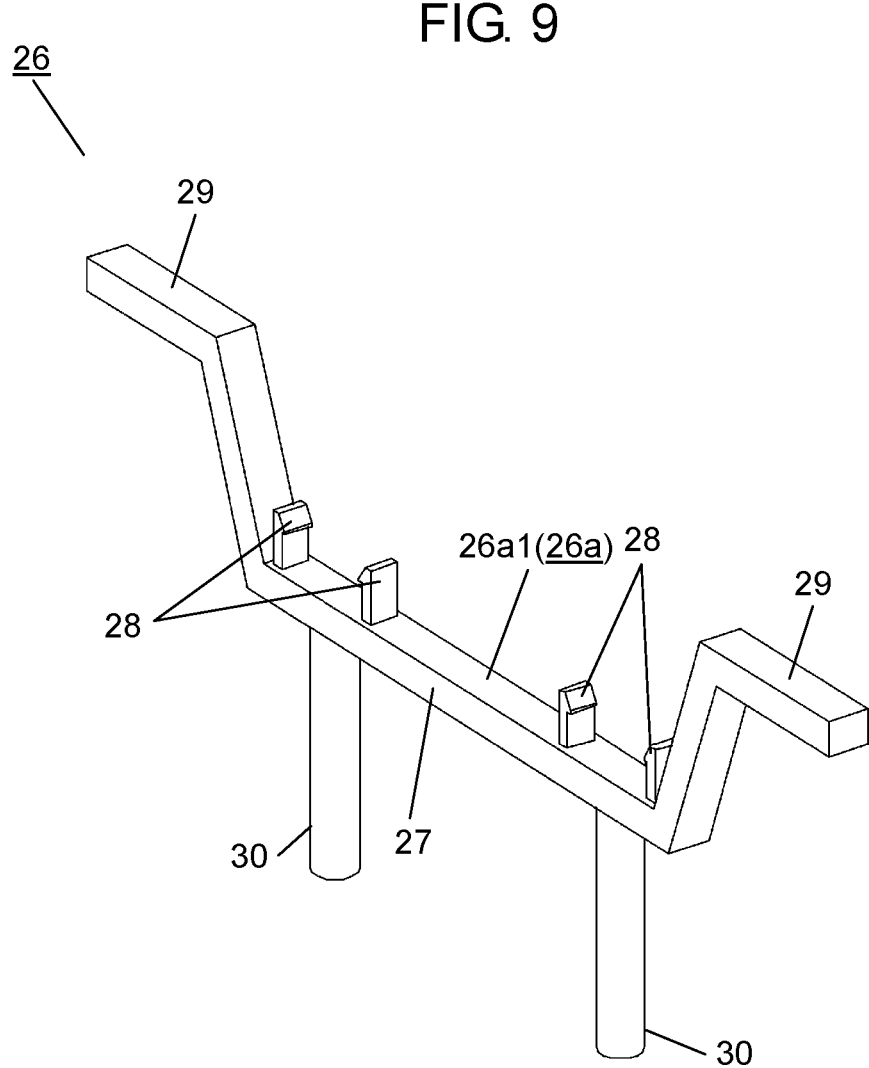
FIG. 9 is a perspective view of a support member in the gas flowmeter.
Figure 10:
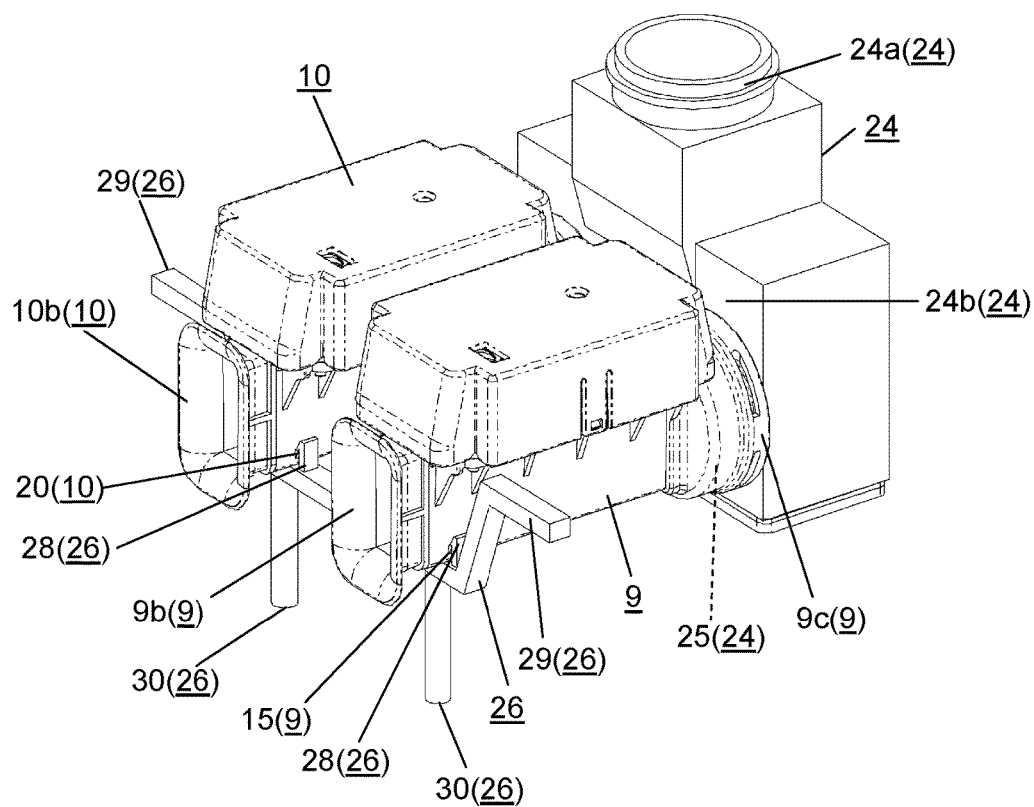
FIG. 10 is a perspective view of the main part of the gas flowmeter.

FIG. 7 is a view for describing the gas flowmeter according to the second exemplary embodiment of the present invention. FIG. 8 is an enlarged cross-sectional view of a main part of the gas flowmeter. FIG. 9 is a perspective view of a support member in the gas flowmeter. FIG. 10 is a perspective view of a main part of the gas flowmeter.

The gas flowmeter of this exemplary embodiment differs from the first exemplary embodiment in that ultrasonic flow rate measuring unit 9 and flow passage member 10 are arranged in a horizontal direction (also referred to as "lateral direction") which is orthogonal to a vertical direction. Here, "lateral direction" means a direction which is orthogonal to a direction that connecting pipe 24 shown in FIG. 7 or the like is connected to outlet pipe 5.

That is, as shown in FIG. 7 to FIG. 10, in the gas flowmeter of this exemplary embodiment, connecting pipe 24 is formed into a convex shape. Connecting portion 24a which is connected with outlet pipe 5 is formed on a projecting portion of the convex portion of connecting pipe 24, and two mounting portions 25, that is, left and right mounting portions 25 are formed on side surface 24b of the convex portion.

As shown in FIG. 9, support member 26 includes recessed portion 26a having an inverted trapezoidal shape, for example, at a center portion of support member 26, and includes fixing portion 27 on upper surface 26a1 of a bottom side of recessed portion 26a. A pair of locking pawls 28 which is locked with locking projection 15 of ultrasonic flow rate measuring unit 9 and a pair of locking pawls 28 which is locked with locking projection 20 of flow passage member 10 are formed on left and right sides of fixing portion 27. Support member 26 includes support arms 29 extending outward on both sides of recessed portion 26a of fixing portion 27 on an open end. Support member 26 further includes one or more support legs 30 extending downward from a position corresponding to locking pawls 28 formed on fixing portion 27.

The gas flowmeter of this exemplary embodiment is configured as described above.

The method for forming the gas flowmeter according to this exemplary embodiment is described hereinafter.

Firstly, as shown in FIG. 8, locking projection 15 of ultrasonic flow rate measuring unit 9 and locking projection 20 of flow passage member 10 are locked to locking pawls 28 formed on fixing portion 27 of support member 26. With such an operation, ultrasonic flow rate measuring unit 9 and flow passage member 10 are fixed to support member 26.

Next, outflow port 9c of ultrasonic flow rate measuring unit 9 and outflow port 10c of flow passage member 10 are connected to corresponding mounting portions 25 of connecting pipe 24, and are fixed by fixing fittings (not shown in the drawing). Fixing of ultrasonic flow rate measuring unit 9 and flow passage member 10 to mounting portions 25 may be performed using engaging pawls or the like. With such a configuration, fixing fittings can be eliminated. As a result, assembling operability is enhanced and hence, a gas flowmeter can be configured at a lower cost.

In the above state, connecting pipe 24, ultrasonic flow rate measuring unit 9, flow passage member 10 and support member 26 are integrally formed with each other. Accordingly, the above-mentioned parts can be handled as one unit. As a result, handling of these parts is enhanced and hence, operability in assembling these parts to device body 1 is enhanced.

Next, upper case 2 is reversed so as to assemble connecting pipe 24, ultrasonic flow rate measuring unit 9, flow passage member 10 and the like which are formed into a unit into device body 1.

Next, connecting portion 24a of connecting pipe 24 is connected to outlet pipe 5 fixed to upper case 2. Then, support arms 29 of support members 26 are temporarily held by holding portions 18 of upper case 2.

Then, upper case 2 is covered by lower case 3, and peripheries of upper case 2 and lower case 3 are air-tightly sealed by way of the sealing member, for example.

That is, in the gas flowmeter according to this exemplary embodiment, outflow port 9c of ultrasonic flow rate measuring unit 9 and outflow port 10c of flow passage member 10 are connected to mounting portions 25 of connecting pipe 24. An inflow port 9b side of ultrasonic flow rate measuring unit 9 and an inflow port 10b side of flow passage member 10 are held by holding portions 18 of device body 1 by way of support arms 29 of support members 26. Further, the inflow port 9b side of ultrasonic flow rate measuring unit 9 and the inflow port 10b side of flow passage member 10 are supported in a contact manner with an inner surface of lower case 3 by way of support legs 30 of support members 26. With such a configuration, ultrasonic flow rate measuring unit 9 and flow passage member 10 are stably supported and fixed to device body 1. As a result, the gas flowmeter can perform stable flow rate measurement by suppressing swinging of ultrasonic flow rate measuring unit 9.

Further, with the above configuration, even when vibrations are generated during transportation of a gas flowmeter or the like, swinging of ultrasonic flow rate measuring unit 9 and flow passage member 10 can be suppressed. Accordingly, the deformation or the like in a connecting portion between outlet pipe 5 and upper case 2 can be suppressed. As a result, it is possible to suppress the deterioration of sealing property at the connecting portion between outlet pipe 5 and upper case 2 and hence, high reliability can be maintained.

In the above exemplary embodiment, the description has been made with respect to the example where ultrasonic flow rate measuring unit 9 and flow passage member 10 are connected to connecting pipe 24 in a state where ultrasonic flow rate measuring unit 9 and flow passage member 10 are supported by support member 26. However, the present invention is not limited to such a configuration. For example, the configuration may be adopted where ultrasonic flow rate measuring unit 9 and flow passage member 10 are supported by support member 26 after ultrasonic flow rate measuring unit 9 and flow passage member 10 are connected to connecting pipe 24.

Third Exemplary Embodiment

Hereinafter, the configuration of a gas flowmeter of a third exemplary embodiment of the present invention is described with reference to FIG. 11 to FIG. 18. Parts having an identical configuration with the corresponding parts of the first exemplary embodiment or the second exemplary embodiment are given the same symbols and the description of these parts is omitted. The arrangement of ultrasonic flow rate measuring unit 9 and flow passage member 10 with respect to connecting pipe 31 in this exemplary embodiment is substantially similar to the corresponding arrangement in the second exemplary embodiment.

Figure 11:
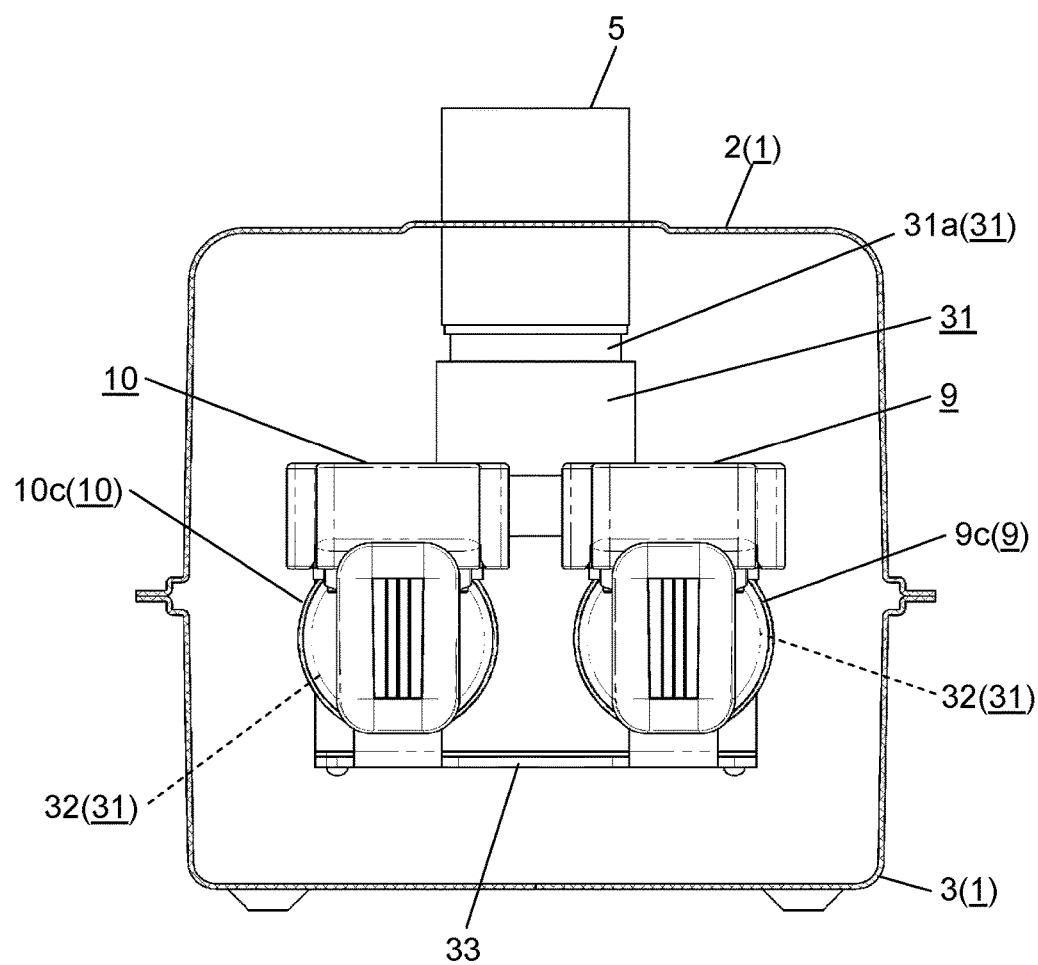
FIG. 11 is a view for describing a gas flowmeter according to a third exemplary embodiment of the present invention.
Figure 12:
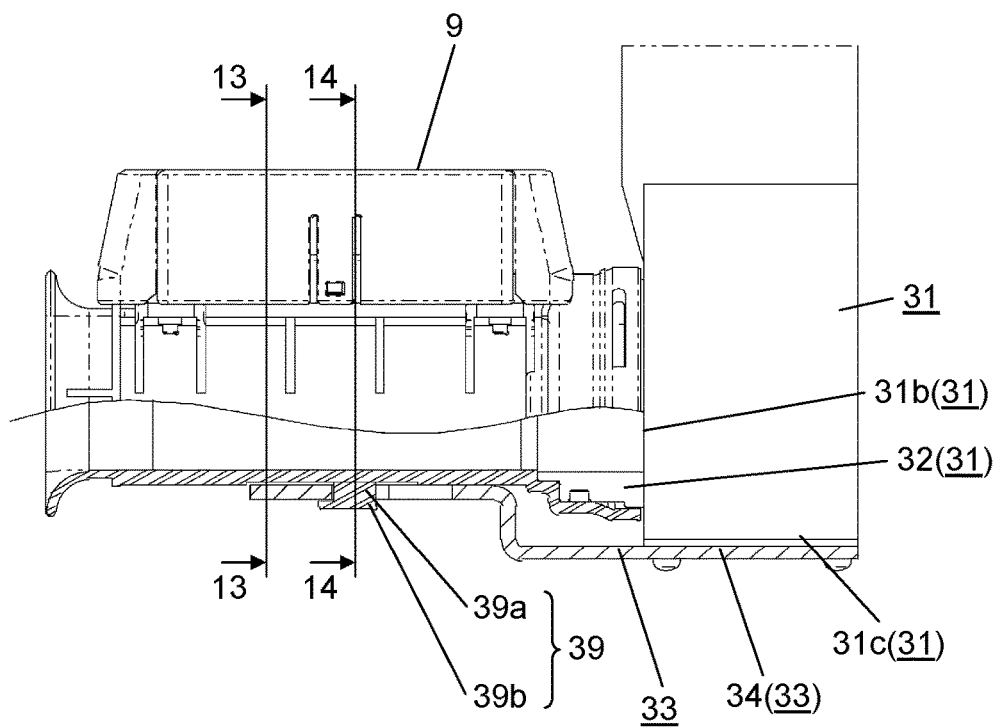
FIG. 12 is an enlarged cross-sectional view of a main part of the gas flowmeter.
Figure 13:
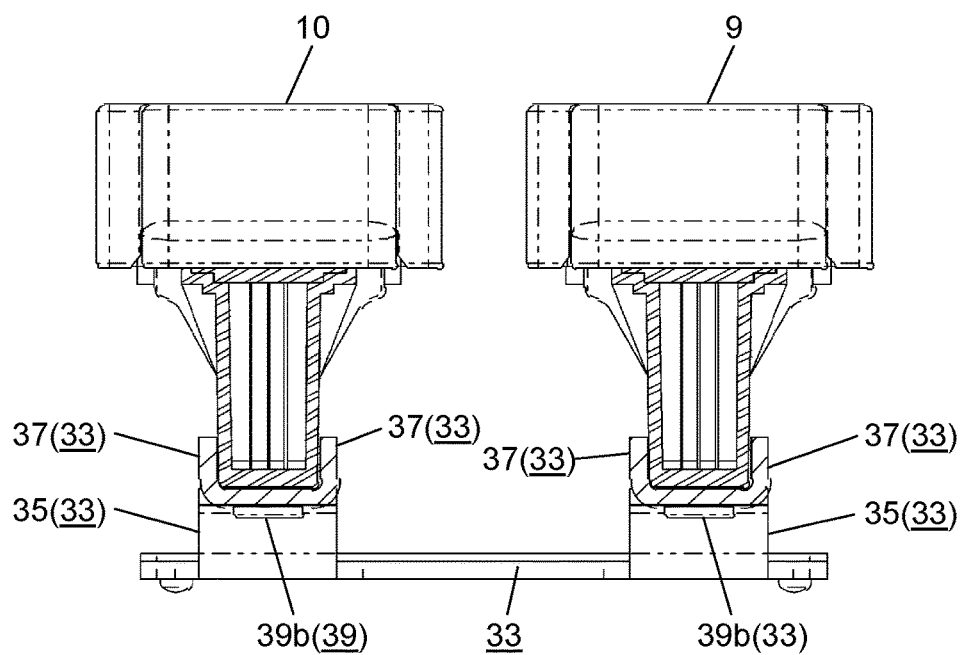
FIG. 13 is a cross-sectional view taken along line 13-13 in FIG. 12.
Figure 14:
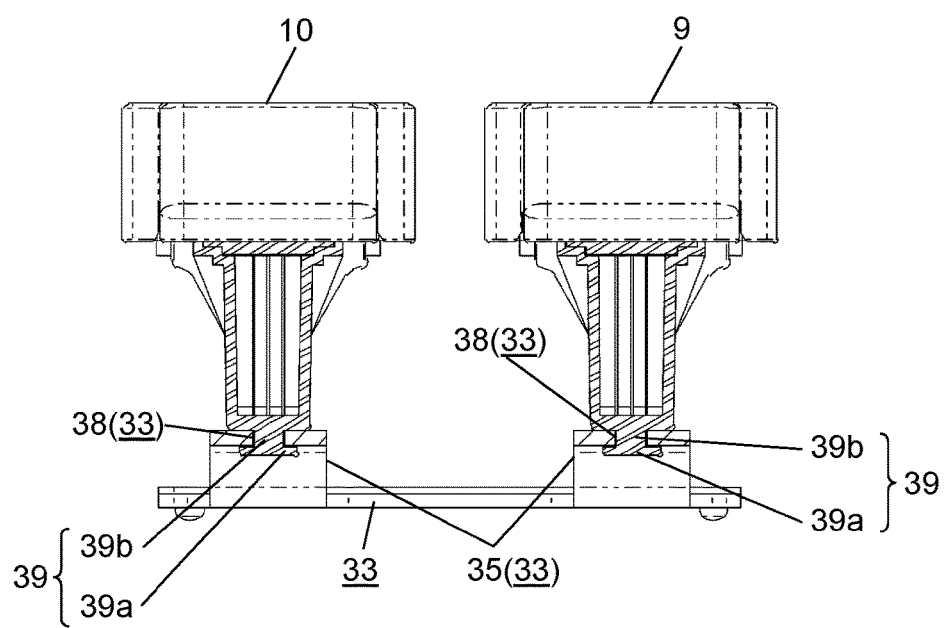
FIG. 14 is a cross-sectional view taken along line 14-14 in FIG. 12.
Figure 15:
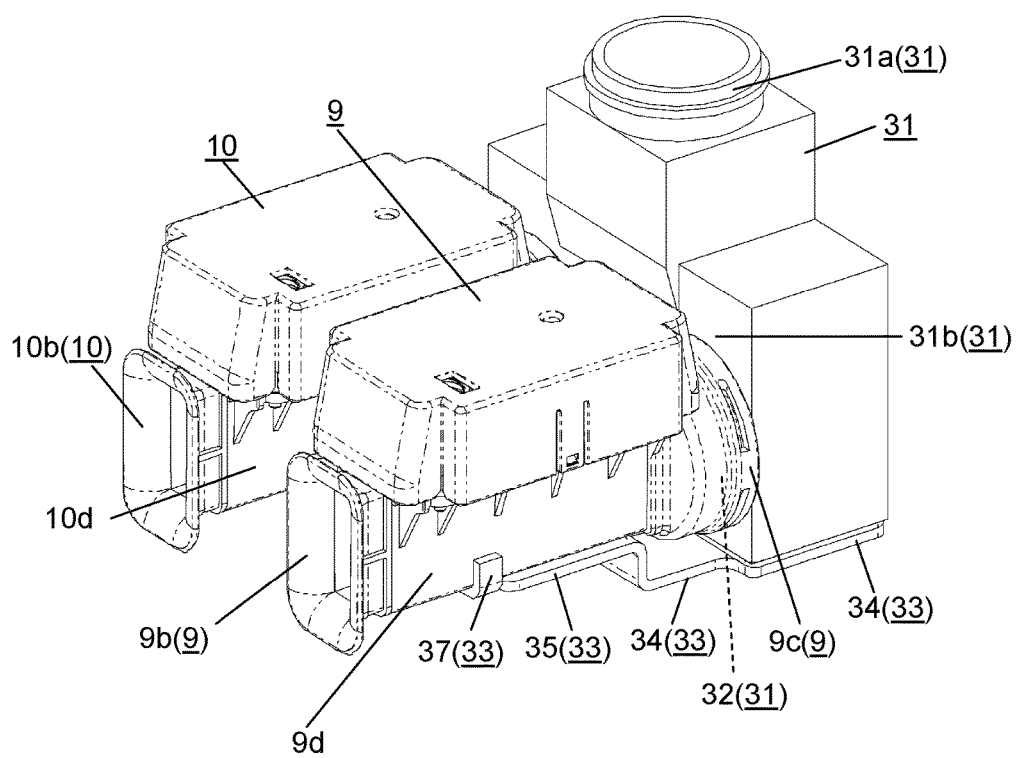
FIG. 15 is a perspective view of the main part of the gas flowmeter.
Figure 16:
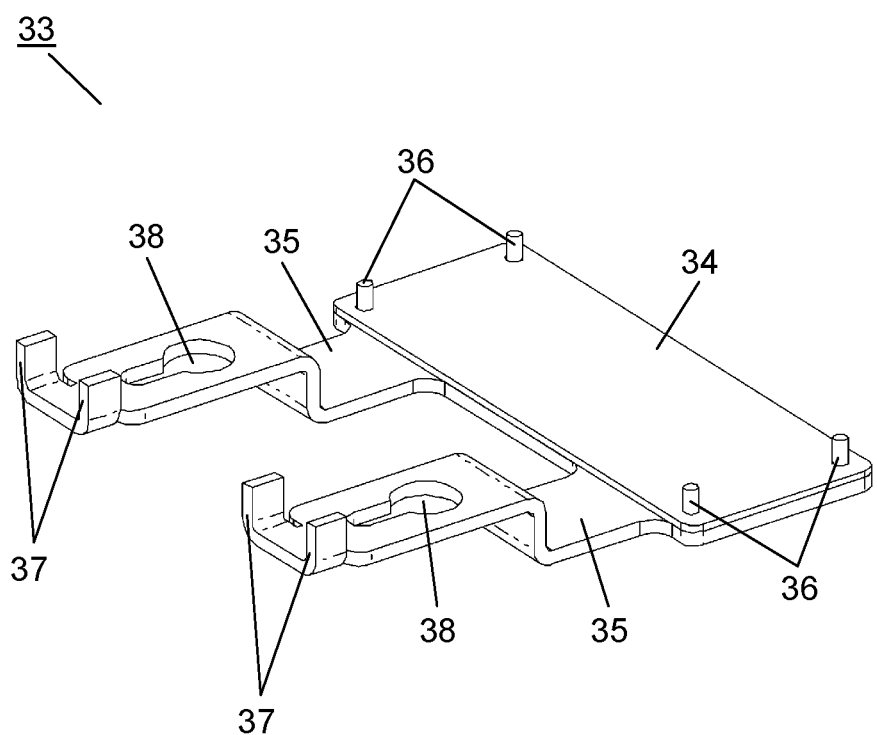
FIG. 16 is a perspective view of a support member in the gas flowmeter.
Figure 17:
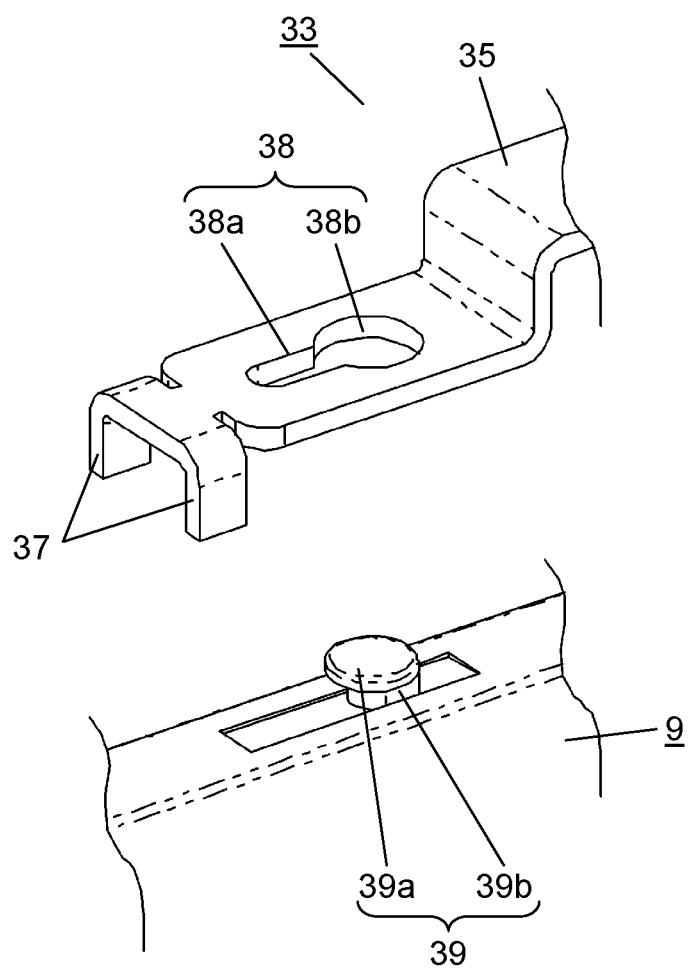
FIG. 17 is an exploded perspective view for describing the connection between the support member and an ultrasonic flow rate measuring unit in the gas flowmeter.
Figure 18:
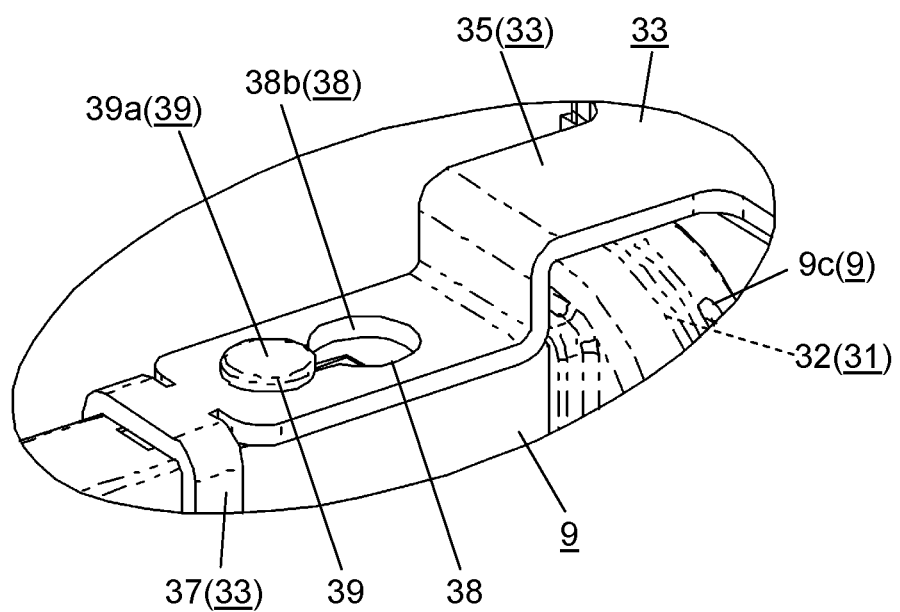
FIG. 18 is a perspective view showing a connection state between the support member and the ultrasonic flow rate measuring unit in the gas flowmeter.

FIG. 11 is a view for describing the gas flowmeter according to the third exemplary embodiment of the present invention. FIG. 12 is a cross-sectional view of a main part of the gas flowmeter. FIG. 13 is a cross-sectional view taken along line 13-13 in FIG. 12. FIG. 14 is a cross-sectional view taken along line 14-14 in FIG. 12. FIG. 15 is a perspective view of the main part of the gas flowmeter. FIG. 16 is a perspective view of a support member in the gas flowmeter. FIG. 17 is a perspective view for describing the connection between the support member and an ultrasonic flow rate measuring unit in the gas flowmeter. FIG. 18 is a perspective view showing a connection state between the support member and the ultrasonic flow rate measuring unit in the gas flowmeter.

As described in detail hereinafter, in the gas flowmeter of this exemplary embodiment, the configuration of support member 33 differs from the configurations of support member 11 in the first exemplary embodiment and support member 26 in the second exemplary embodiment.

That is, as shown in FIG. 11 to FIG. 18, in the gas flowmeter of this exemplary embodiment, in the same manner as the second exemplary embodiment, connecting pipe 31 is formed into a convex shape. Connecting portion 31a which is connected with outlet pipe 5 is formed on a projecting portion of the convex portion of connecting pipe 31, and two mounting portions 32, that is, left and right mounting portions 32 are formed on side surface 31b of the convex portion. Two mounting portions 32 are connected to outflow port 9c of ultrasonic flow rate measuring unit 9 and outflow port 10c of flow passage member 10 respectively.

As shown in FIG. 12, support member 33 supports ultrasonic flow rate measuring unit 9 and flow passage member 10 from below, and is fixed to lower surface 31c of connecting pipe 31.

To be more specific, as shown in FIG. 16, support member 33 includes base portion 34 fixed to lower surface 31c of connecting pipe 31, and a pair of holding portions 35 extending from base portion 34. The pair of holding portions 35 supports ultrasonic flow rate measuring unit 9 and flow passage member 10 from below respectively. Base portion 34 has projections 36 for positioning connecting pipe 31 at four corners of an upper surface of base portion 34. Projections 36 of base portion 34 are inserted into positioning holes (not shown in the drawing) formed in lower surface 31c of connecting pipe 31 so as to position support member 33 with respect to connecting pipe 31, and lower surface 31c of connecting pipe 31 is adhered and fixed to connecting pipe 31, for example.

One of the pair of holding portions 35 has a pair of raised lugs 37 for positioning both side surfaces 9d of ultrasonic flow rate measuring unit 9 on a free end side thereof, and the other of the pair of holding portions 35 has a pair of raised lugs 37 for positioning both side surfaces 10d of flow passage member 10 on a free end side thereof. As shown in FIG. 17, mounting hole 38 having a so-called key hole shape formed of elongated hole shaped portion 38a having circular hole shaped portion 38b having a large diameter is formed in holding portion 35 on one end side.

On the other hand, fixing portion 39 fixed to mounting hole 38 formed in support member 33 is formed on a lower surface of ultrasonic flow rate measuring unit 9 and a lower surface of flow passage member 10 respectively in a projecting manner. Fixing portion 39 is formed of head portion 39a and leg portion 39b. Head portion 39a is formed with a diameter larger than elongated hole shaped portion 38a of mounting hole 38 formed in support member 33 and smaller than circular hole shaped portion 38b of mounting hole 38 formed in support member 33. Leg portion 39b is formed with a diameter smaller than elongated hole shaped portion 38a of mounting hole 38.

Support member 33 of the gas flowmeter of this exemplary embodiment is configured as described above.

The method for forming the gas flowmeter according to this exemplary embodiment is described hereinafter.

Firstly, as shown in FIG. 17, both side surfaces 9d of ultrasonic flow rate measuring unit 9 and both side surfaces 10d of flow passage member 10 are positioned by raised lugs 37 of holding portions 35 of support member 33 from below. Then, head portion 39a of each fixing portion 39 is inserted into circular hole shaped portion 38b of mounting hole 38 formed in each support member 33.

Next, as shown in FIG. 18, leg portion 39b of fixing portion 39 of ultrasonic flow rate measuring unit 9 and leg portion 39b of fixing portion 39 of flow passage member 10 are made to slide so as to be positioned in elongated hole shaped portions 38a of mounting holes 38 formed in support members 33 respectively so that leg portion 39b and leg portion 39b are fitted to elongated hole shaped portions 38a of mounting holes 38 respectively. With such fitting, ultrasonic flow rate measuring unit 9 and flow passage member 10 are fixed to support member 33. That is, with the above state, ultrasonic flow rate measuring unit 9 and flow passage member 10 are joined to each other by support member 33 thus formed into an integral body. As a result, handling of ultrasonic flow rate measuring unit 9 and flow passage member 10 is enhanced.

Then, outflow port 9c of ultrasonic flow rate measuring unit 9 and outflow port 10c of flow passage member 10 are connected to corresponding mounting portions 32 of connecting pipe 31, and are fixed by fixing fittings (not shown in the drawing). Then, base portion 34 of support member 33 is adhered and fixed to lower surface 31c of connecting pipe 31, for example.

Then, upper case 2 is reversed for enabling assembling of connecting pipe 31, ultrasonic flow rate measuring unit 9, flow passage member 10 and the like which are formed into a unit into device body 1.

Then, connecting portion 31a of connecting pipe 31 is connected to outlet pipe 5 fixed to upper case 2.

Then, upper case 2 is covered by lower case 3, and peripheries of upper case 2 and lower case 3 are air-tightly sealed by way of a sealing member, for example.

That is, according to this exemplary embodiment, ultrasonic flow rate measuring unit 9 and flow passage member 10 are joined to each other by support member 33 thus formed into an integral body. With such a configuration, vibrations of ultrasonic flow rate measuring unit 9 can be suppressed so that accuracy in measuring a flow rate can be enhanced. Further, by suppressing vibrations of ultrasonic flow rate measuring unit 9 and flow passage member 10, transmission of vibrations to outlet pipe 5 can be also suppressed. Accordingly, the transmission of vibrations to a connecting portion between outlet pipe 5 and upper case 2 is reduced. As a result, it is possible to suppress the deterioration of sealing property at the connecting portion between outlet pipe 5 and upper case 2 and hence, a gas flowmeter having high reliability can be implemented.

Fourth Exemplary Embodiment

Hereinafter, the configuration of a gas flowmeter of a fourth exemplary embodiment of the present invention is described with reference to FIG. 19 to FIG. 22. Parts having an identical configuration with the corresponding parts of the first to third exemplary embodiments are given the same symbols and the description of these parts is omitted.

Figure 19:
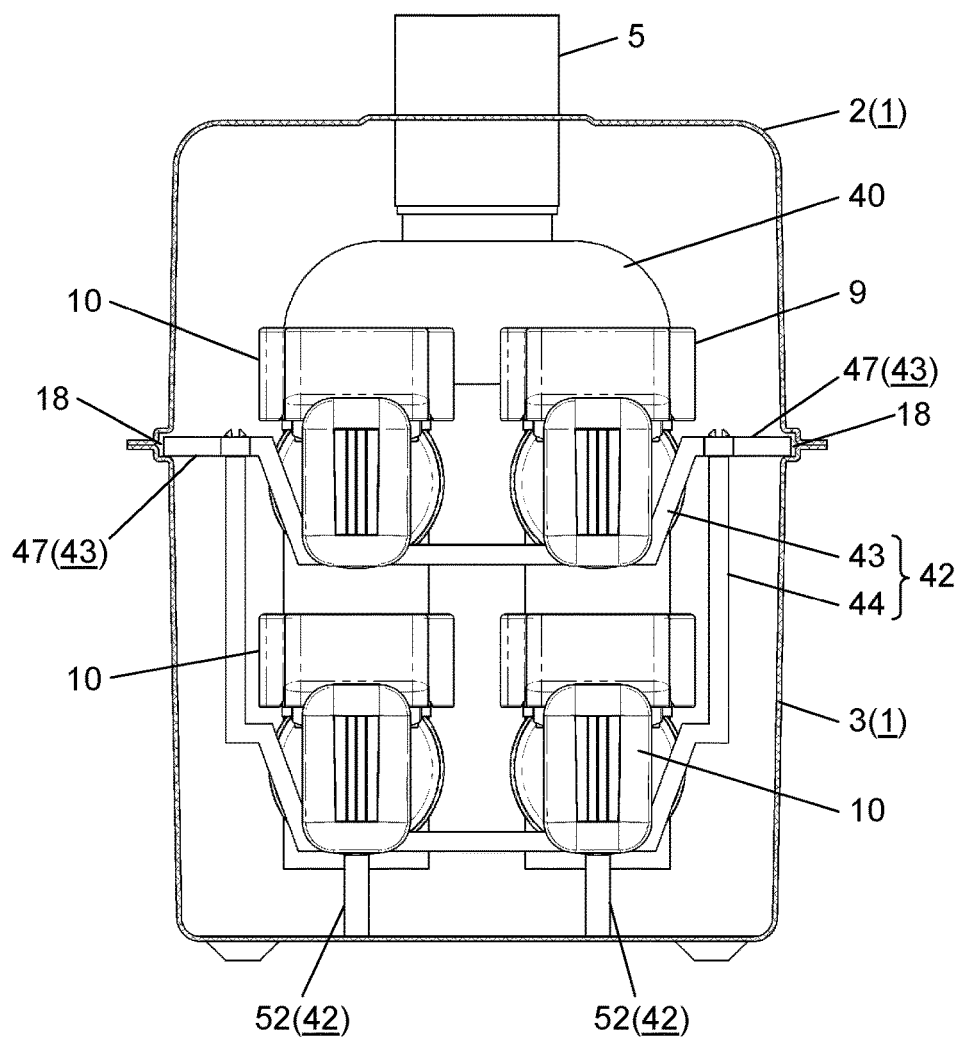
FIG. 19 is a view for describing a gas flowmeter according to a fourth exemplary embodiment of the present invention.
Figure 20:
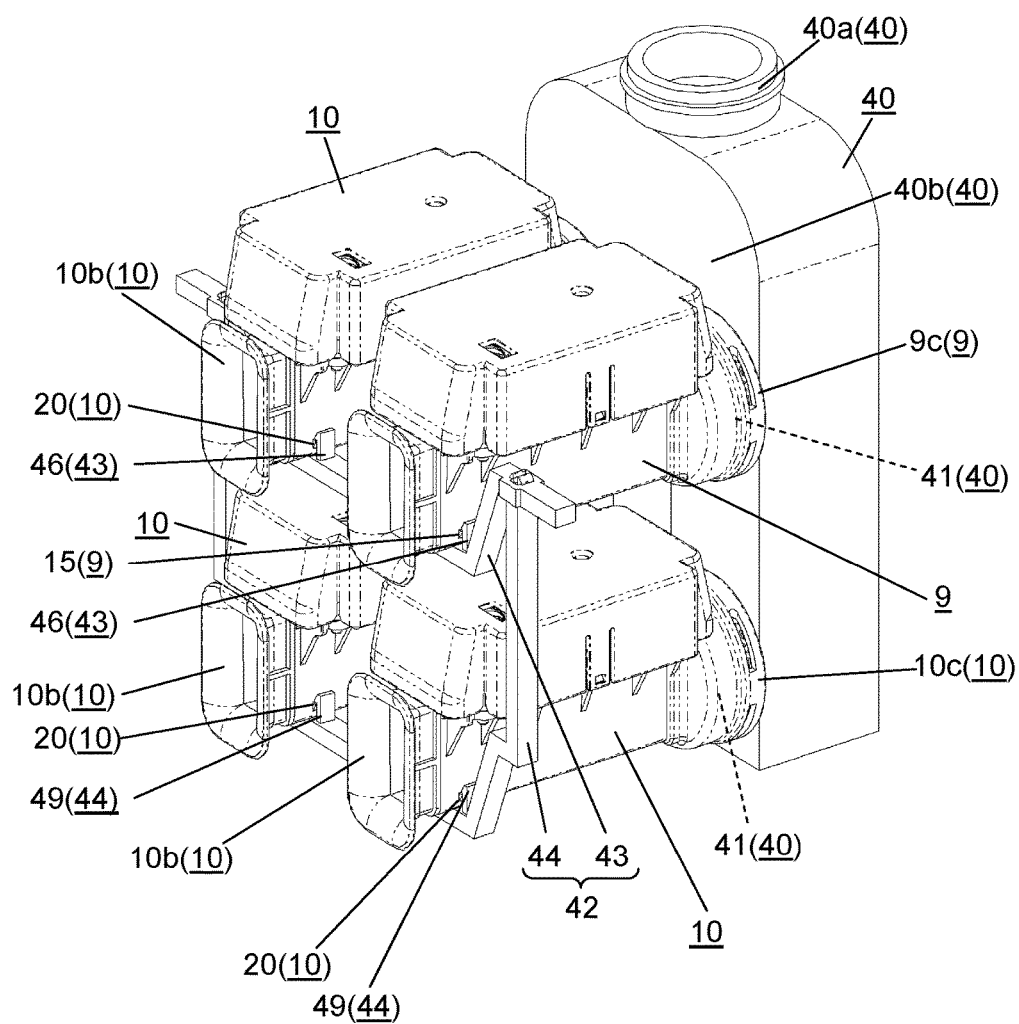
FIG. 20 is a perspective view of a main part of the gas flowmeter.
Figure 21:
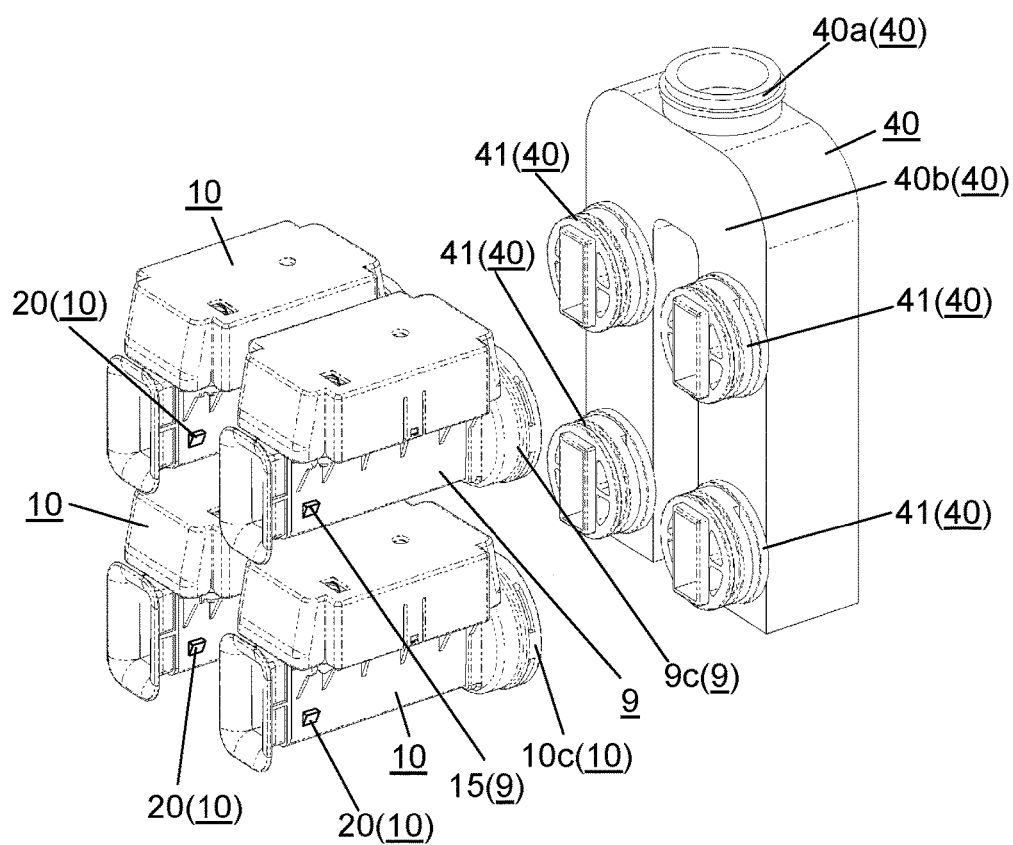
FIG. 21 is an exploded perspective view of the main part of the gas flowmeter.
Figure 22:
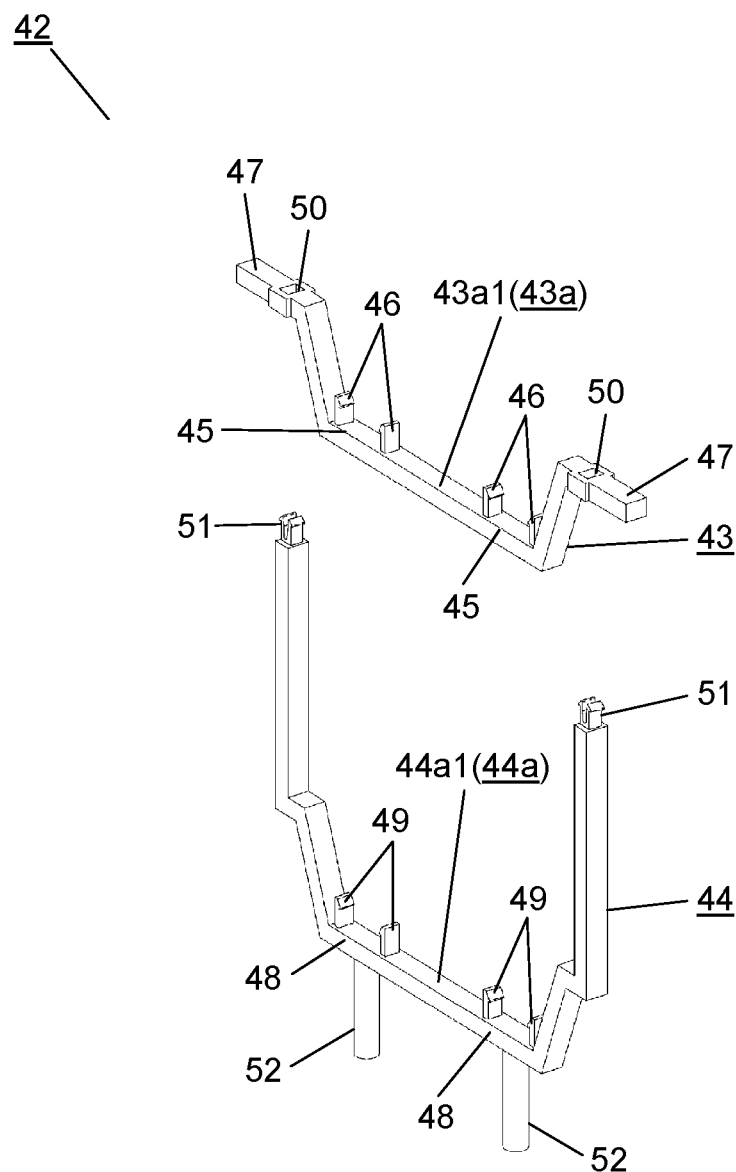
FIG. 22 is an exploded perspective view of a support member in the gas flowmeter.

FIG. 19 is a view for describing the gas flowmeter according to the fourth exemplary embodiment of the present invention. FIG. 20 is a perspective view of a main part of the gas flowmeter. FIG. 21 is an exploded perspective view of the main part of the gas flowmeter. FIG. 22 is an exploded perspective view of a support member in the gas flowmeter.

The gas flowmeter of this exemplary embodiment differs from the gas flowmeters of the previously-mentioned respective exemplary embodiments in that four mounting portions 41 having the same shape are formed on side surface 40b of connecting pipe 40 in total. Four mounting portions 41 are arranged in a two-by-two matrix. The configuration in this exemplary embodiment is similar to the configuration obtained by combining the first exemplary embodiment and the second exemplary embodiment with each other. Here, ultrasonic flow rate measuring unit 9 is connected to at least any one of mounting portions 41. Flow passage members 10 are connected to remaining mounting portions 41. To be more specific, in this exemplary embodiment, FIG. 19 shows a state where ultrasonic flow rate measuring unit 9 is connected to right upper mounting portion 41. However, it is needless to say that ultrasonic flow rate measuring unit 9 may be connected to mounting portion 41 other than right upper mounting portion 41.

Ultrasonic flow rate measuring unit 9 and flow passage member 10 are joined to each other by support member 42 at positions in the vicinity of inflow ports 9b, 10b disposed away from connecting pipe 40. With such a configuration, one ultrasonic flow rate measuring unit 9 and three flow passage members 10 are integrally supported by support member 42. In such a configuration, support member 42 is configured by upper support member 43 and lower support member 44. Upper support member 43 supports ultrasonic flow rate measuring unit 9 and flow passage member 10 mounted on upper mounting portions 41 of connecting pipe 40. Lower support member 44 supports two flow passage members 10 mounted on lower mounting portions 41 of connecting pipe 40.

To be more specific, as shown in FIG. 22, upper support member 43 includes recessed portion 43a having an inverted trapezoidal shape at a center portion of upper support member 43, and includes a pair of left and right fixing portions 45 for fixing ultrasonic flow rate measuring unit 9 and flow passage member 10 on upper surface 43a1 of a bottom side of recessed portion 43a. Locking pawls 46 are formed on fixing portions 45. As shown in FIG. 20 and FIG. 21, locking pawls 46 engage with locking projections 15, 20 formed on outer side surfaces of lower portions of ultrasonic flow rate measuring unit 9 and flow passage member 10 so as to fix ultrasonic flow rate measuring unit 9 and flow passage member 10 to upper support member 43.

Upper support member 43 includes support arms 47 extending outward on both sides of recessed portion 43a on an open end. As shown in FIG. 19, support arms 47 are positioned and held by holding portions 18 formed by contact portions where upper case 2 and lower case 3 are brought into contact with each other. Holding portions 18 are formed only at positions corresponding to support arms 47, and stably hold support arms 47 in a sandwiching manner.

Lower support member 44 is formed into an approximately U shape (including "U shape"), and includes recessed portion 44a having an inverted trapezoidal shape, for example, at a center portion of lower support member 44 in the same manner as upper support member 43. A pair of left and right fixing portions 48 for fixing two flow passage members 10 is formed on upper surface 44a1 of a bottom side of recessed portion 44a of lower support member 44. Locking pawls 49 are formed on fixing portion 48. As shown in FIG. 20 and FIG. 21, locking pawls 49 engage with locking projections 20 formed on side surfaces of lower portions of flow passage members 10 so as to fix two flow passage members 10 to lower support member 44. Further, engaging pawls 51 are formed on upper portions of both ends of lower support member 44. Further, engaging pawls 51 are engaged with engaging holes 50 formed in support arms 47 of upper support member 43. Lower support member 44 includes one or more support legs 52 extending downward from positions corresponding to locking pawls 49 of fixing portion 48.

The gas flowmeter of this exemplary embodiment is configured as described above.

The method for forming the gas flowmeter according to this exemplary embodiment is described hereinafter.

Firstly, locking projection 15 of ultrasonic flow rate measuring unit 9 is locked to locking pawls 46 formed on one fixing portion 45 of upper support member 43. With such an operation, ultrasonic flow rate measuring unit 9 is fixed to one fixing portion 45 of upper support member 43.

Next, locking projection 20 of flow passage member 10 is locked to locking pawls 46 formed on the other fixing portion 45 of upper support member 43. With such an operation, flow passage member 10 is fixed to the other fixing portion 45 of upper support member 43.

Then, locking projections 20 of flow passage members 10 are locked to locking pawls 49 formed on two fixing portions 48 of lower support member 44. With such an operation, a pair of flow passage members 10 is fixed to two fixing portions 48 of lower support member 44.

Then, engaging pawls 51 of lower support member 44 to which two flow passage members 10 are fixed are engaged with engaging holes 50 formed in support arms 47 of upper support member 43 to which ultrasonic flow rate measuring unit 9 and flow passage member 10 are fixed.

Then, in the above-mentioned state, outflow port 9c of ultrasonic flow rate measuring unit 9 and outflow port 10c of flow passage member 10 are connected to corresponding mounting portions 41 of connecting pipe 40, and are fixed by fixing fittings (not shown in the drawing). Fixing of ultrasonic flow rate measuring unit 9 and flow passage member 10 to mounting portions 41 may be performed using engaging pawls or the like. With such a configuration, fixing fittings can be eliminated. As a result, assembling operability is enhanced and hence, a gas flowmeter can be configured at a lower cost.

In the above-mentioned state, connecting pipe 40, ultrasonic flow rate measuring unit 9, flow passage members 10 and support member 42 are integrally formed with each other. Accordingly, the above-mentioned parts can be handled as one unit. As a result, handling of these parts is enhanced and hence, operability in assembling these parts to device body 1 is enhanced.

Next, upper case 2 is reversed so as to enable assembling of connecting pipe 40, ultrasonic flow rate measuring unit 9, flow passage member 10 and the like which are formed into a unit into device body 1.

Next, connecting portion 40a of connecting pipe 40 is connected to outlet pipe 5 fixed to upper case 2. Then, support arms 47 of support members 42 are temporarily held by holding portions 18 of upper case 2.

Then, upper case 2 is covered by lower case 3, and peripheries of upper case 2 and lower case 3 are air-tightly sealed by way of a sealing member, for example. That is, in the gas flowmeter according to this exemplary embodiment, outflow port 9c of ultrasonic flow rate measuring unit 9 and outflow ports 10c of flow passage members 10 are connected to mounting portions 41 of connecting pipe 40. An inflow port 9b side of ultrasonic flow rate measuring unit 9 and inflow port 10b sides of flow passage members 10 are held by holding portions 18 of device body 1 by way of support arms 47 of support members 42. Further, support legs 52 of support member 42 are brought into contact with an inner surface of lower case 3. With such a configuration, ultrasonic flow rate measuring unit 9 and flow passage members 10 are stably supported by device body 1. As a result, the gas flowmeter can perform stable flow rate measurement by suppressing swinging of ultrasonic flow rate measuring unit 9.

Further, with the above configuration, even when large vibrations are generated during transportation of a gas flowmeter or the like, swinging of ultrasonic flow rate measuring unit 9 and flow passage members 10 can be suppressed. Accordingly, the transmission of vibrations to the connecting portion between outlet pipe 5 and upper case 2 can be suppressed. As a result, it is possible to suppress the deterioration of sealing property at the connecting portion between outlet pipe 5 and upper case 2 and hence, high reliability can be maintained.

In this exemplary embodiment, the description has been made with respect to an example where ultrasonic flow rate measuring unit 9 and flow passage members 10 are connected to connecting pipe 40 in a state that ultrasonic flow rate measuring unit 9 and flow passage members 10 are supported by support member 42. However, the present invention is not limited to such a configuration. For example, the configuration may be adopted where ultrasonic flow rate measuring unit 9 and flow passage member 10 are supported by support member 42 after ultrasonic flow rate measuring unit 9 and flow passage members 10 are connected to connecting pipe 40.

Figure 23:
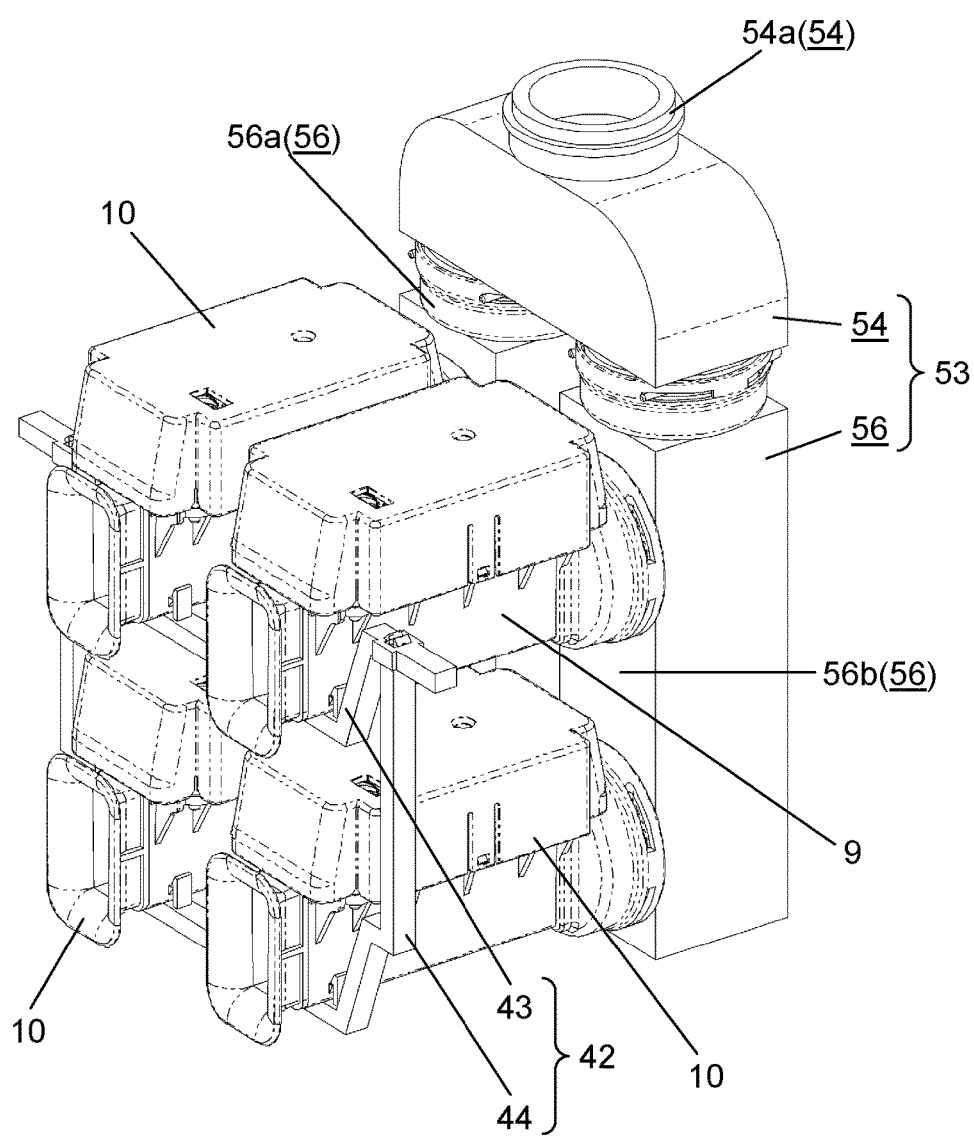
FIG. 23 is a perspective view of a main part showing another example of the gas flowmeter of the exemplary embodiment.
Figure 24:
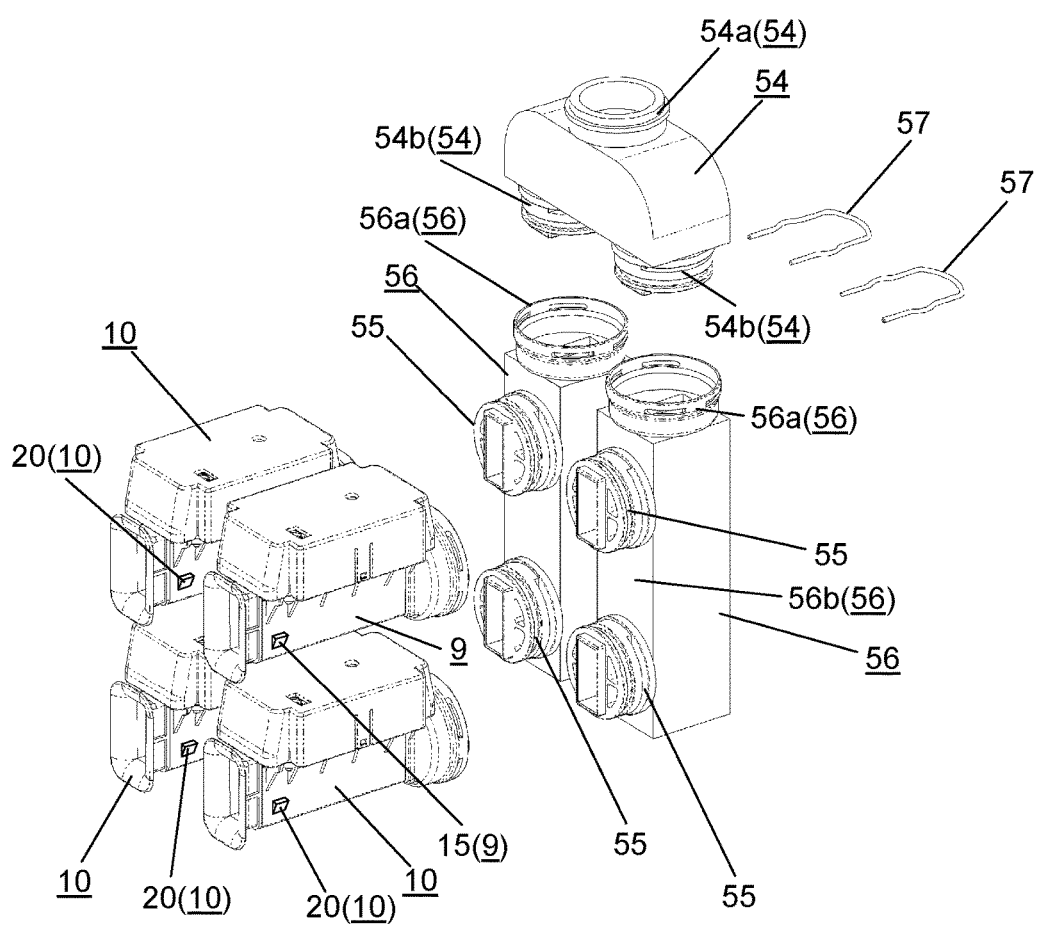
FIG. 24 is an exploded perspective view of the main part of the gas flowmeter shown in FIG. 23.

Further, in this exemplary embodiment, the description has been made with respect to an example where connecting pipe 40 is integrally formed into an inverted U shape. However, the present invention is not limited to such a configuration. For example, as shown in FIG. 23 and FIG. 24, connecting pipe 53 may be formed of joint portion 54 and a pair of connecting sleeves 56. In this case, joint portion 54 has connecting portion 54a connected to outlet pipe 5 on an upper surface thereof, and connecting portions 54b connected to connecting portions 56a of the pair of connecting sleeves 56 on a lower surface thereof. Further, side surface 56b of connecting sleeve 56 has mounting portions 55 connected to outflow port 9c of ultrasonic flow rate measuring unit 9 and outflow port 10c of flow passage member 10. The respective connecting portions are fixed by fixing fittings 57, for example.

Fifth Exemplary Embodiment

Hereinafter, the configuration of a gas flowmeter of a fifth exemplary embodiment of the present invention is described with reference to FIG. 25 to FIG. 30. Parts having an identical configuration with the corresponding parts of the first to fourth exemplary embodiments are given the same symbols and the description of these parts is omitted.

Figure 25:
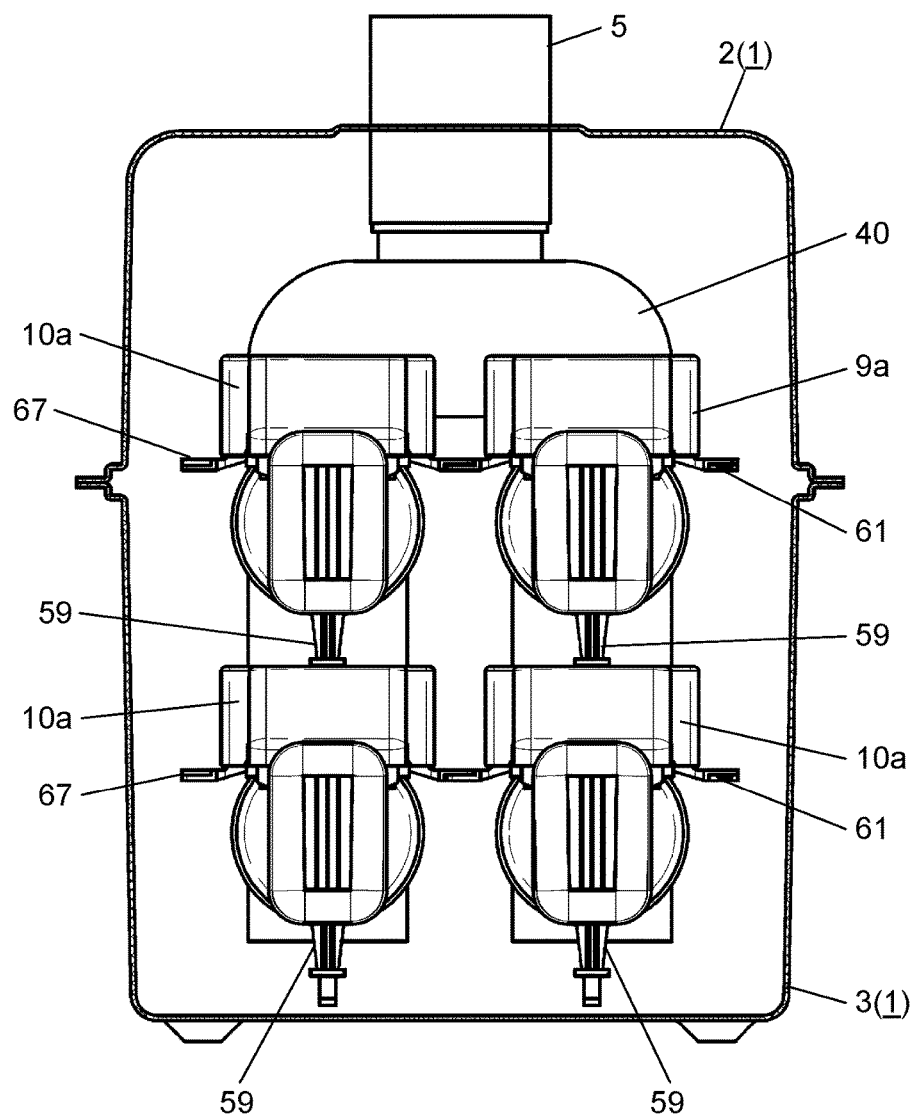
FIG. 25 is a view for describing a gas flowmeter according to a fifth exemplary embodiment of the present invention.
Figure 26:
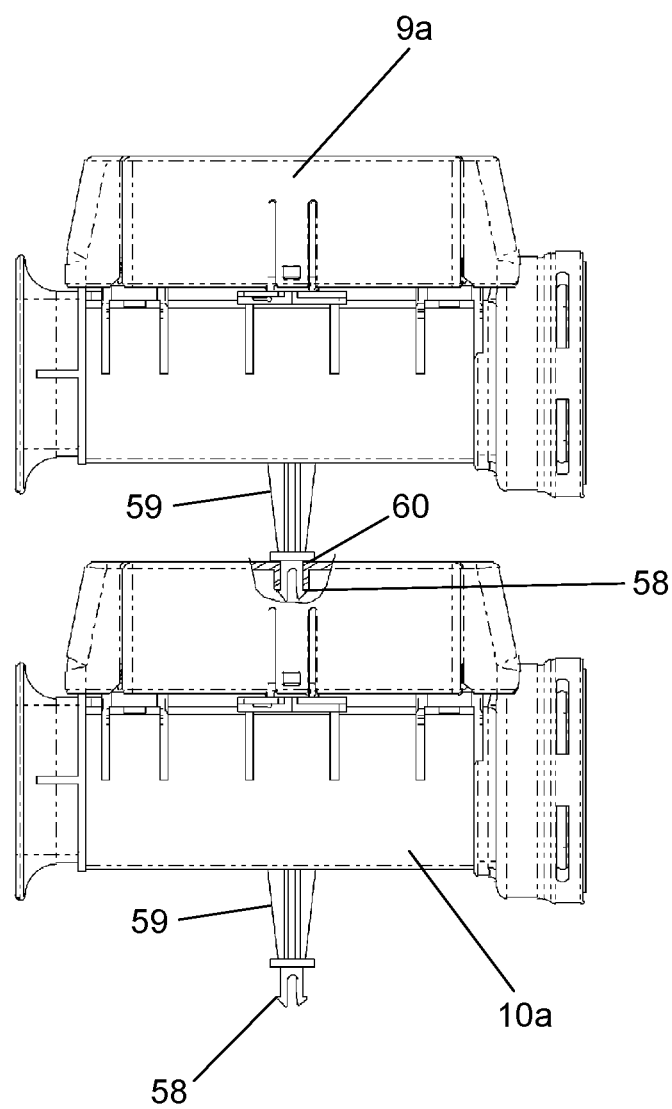
FIG. 26 is a side view with a part broken away of the gas flowmeter.
Figure 27:
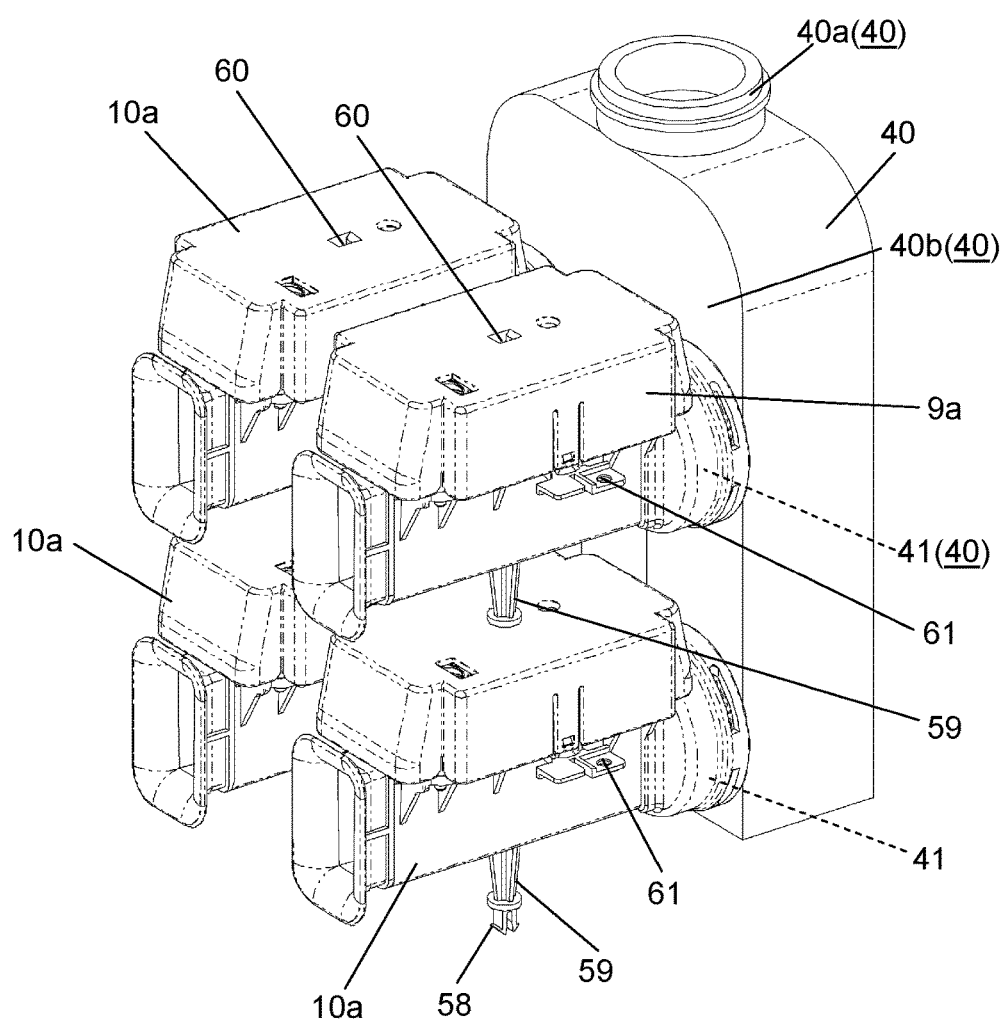
FIG. 27 is a perspective view of a main part of the gas flowmeter.
Figure 28:
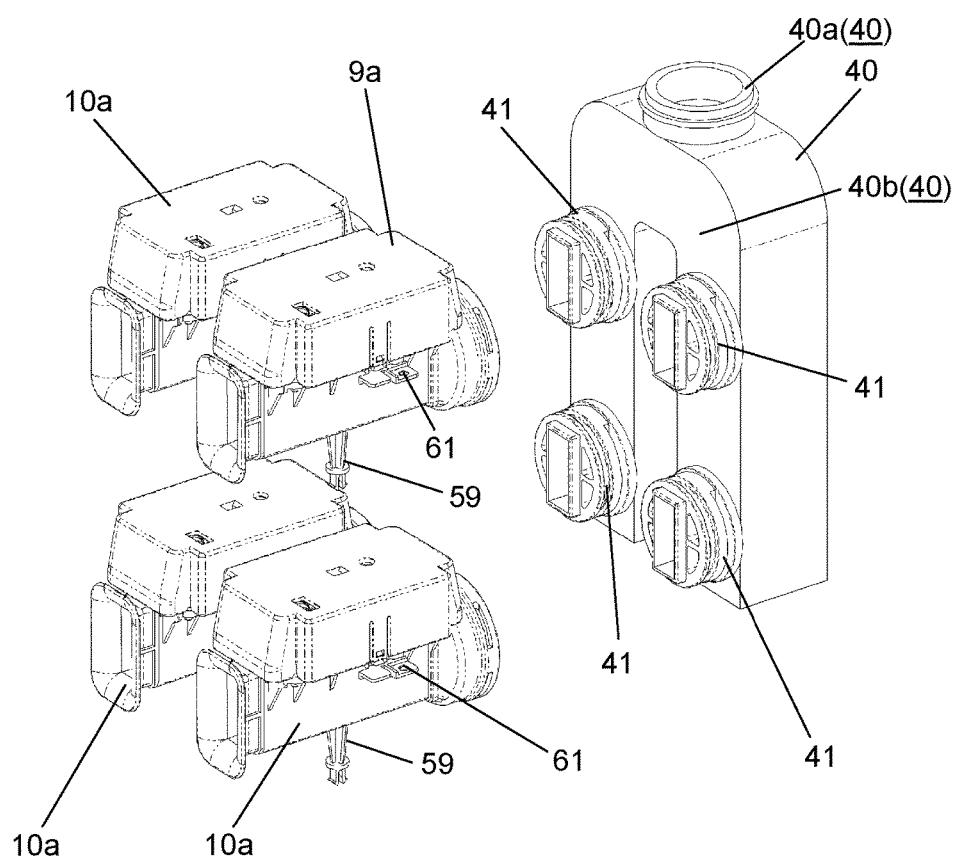
FIG. 28 is an exploded perspective view of a main part of the gas flowmeter.
Figure 29:
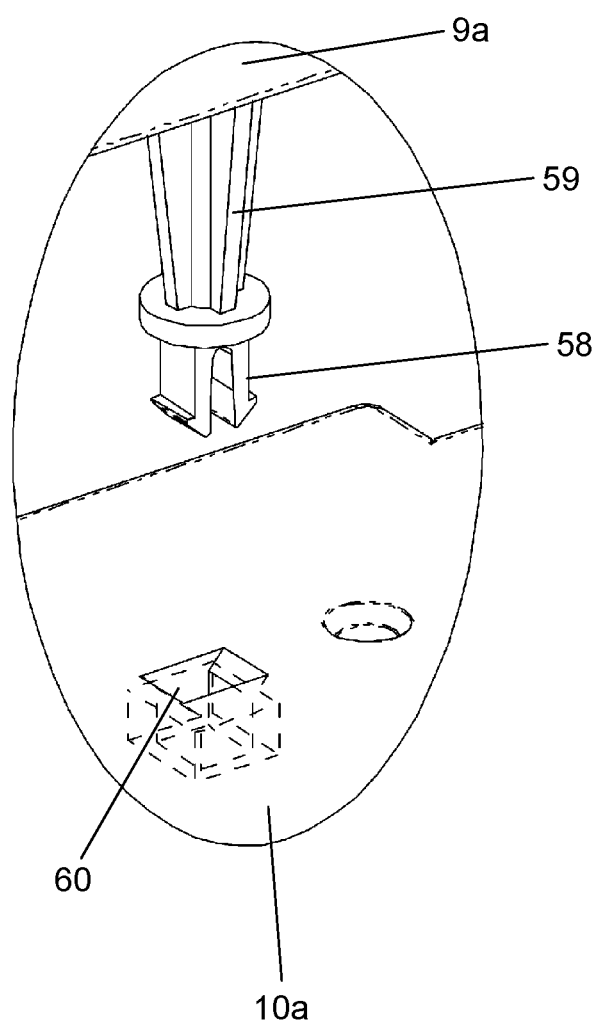
FIG. 29 is an enlarged perspective view of the main part of the gas flowmeter.
Figure 30:
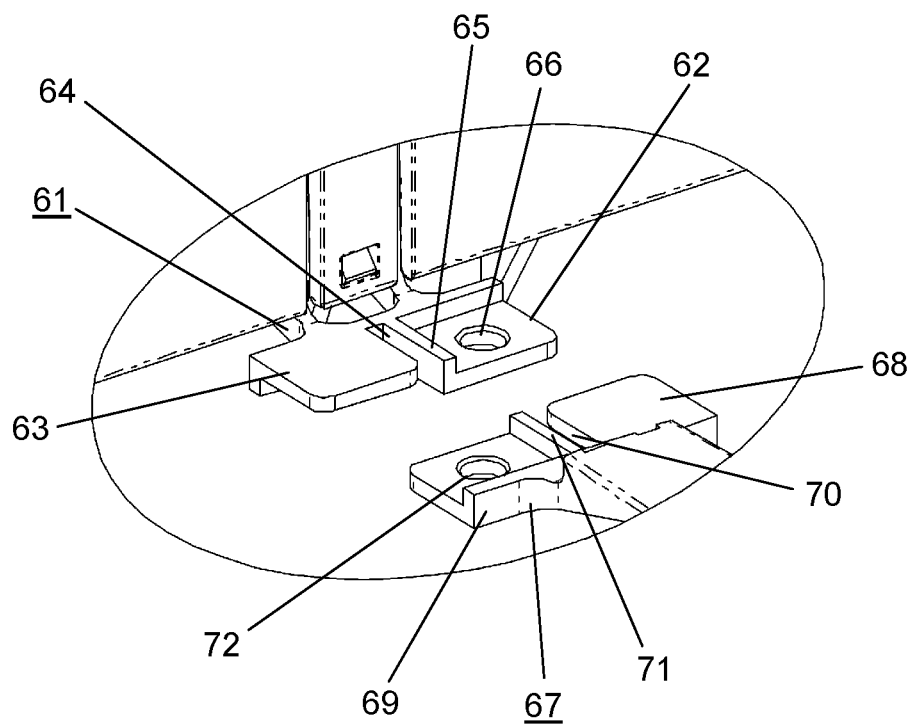
FIG. 30 is an enlarged perspective view of the main part of the gas flowmeter.

FIG. 25 is a view for describing the gas flowmeter according to the fifth exemplary embodiment of the present invention. FIG. 26 is a side view with a part broken away of the gas flowmeter. FIG. 27 is a perspective view of a main part of the gas flowmeter. FIG. 28 is an exploded perspective view of the main part of the gas flowmeter. FIG. 29 is an enlarged perspective view of the main part of the gas flowmeter. FIG. 30 is an enlarged perspective view of the main part of the gas flowmeter.

The gas flowmeter of this exemplary embodiment differs from the gas flowmeter of the fourth exemplary embodiment in that in place of support member 42 provided in the fourth exemplary embodiment, engaging pawl 58 is formed on an upper surface of ultrasonic flow rate measuring unit 9a and an upper surface of each flow passage member 10a, and support leg 59 is formed on a lower surface of ultrasonic flow rate measuring unit 9a and a lower surface of each flow passage member 10a. The gas flowmeter of this exemplary embodiment also differs from the gas flowmeter of the fourth exemplary embodiment in that first locking portion 61 is formed on one side surface of ultrasonic flow rate measuring unit 9a and one side surface of each flow passage member 10a, and second locking portion 67 is formed on the other side surface of ultrasonic flow rate measuring unit 9a and the other side surface of each flow passage member 10a. Other configurations are substantially similar to corresponding configurations of the fourth exemplary embodiment and hence, the description of such configurations is made in a simplified manner.

That is, as shown in FIG. 25 to FIG. 30, in the same manner as the fourth exemplary embodiment, four mounting portions 41 having the same shape are formed on side surface 40b of connecting pipe 40 of the gas flowmeter of this exemplary embodiment in total. Four mounting portions 41 are arranged in a two-by-two matrix. Ultrasonic flow rate measuring unit 9a is connected to at least any one of mounting portions 41. Three flow passage members 10a are connected to remaining mounting portions 41. Here, ultrasonic flow rate measuring unit 9a may be used as flow passage member 10a. In such a case, a function of measuring a flow rate is deleted from ultrasonic flow rate measuring unit 9a, or ultrasonic flow rate measuring unit 9a is not used for measuring a flow rate. With such a configuration, flow passage member 10a is formed of a flow passage having the identical shape with ultrasonic flow rate measuring unit 9a.

In this exemplary embodiment, ultrasonic flow rate measuring unit 9a and flow passage members 10a respectively include, to support each other, support leg 59 having engaging pawl 58 on a distal end thereof and engaging hole 60. Support leg 59 is formed on a lower surface of ultrasonic flow rate measuring unit 9a and a lower surface of each flow passage member 10a in a downwardly projecting manner. Engaging hole 60 is formed in an upper surface of ultrasonic flow rate measuring unit 9*a* and an upper surface of each flow passage members 10*a*. Each engaging pawl 58 of support leg 59 is engaged with engaging hole 60.

Further, first locking portion 61 is formed on one side surface of ultrasonic flow rate measuring unit 9*a* and one side surface of each flow passage member 10*a* in a sidewardly projecting manner. First locking portion 61 includes first locking lug 62 and second locking lug 63. First locking groove 64 is formed between first locking lug 62 and second locking lug 63. First locking lug 62 is formed into a shape where an upper surface side of first locking lug 62 is recessed, and first raised lug 65 is formed on a second locking lug 63 side of first locking lug 62. First locking hole 66 is formed in a center portion of first locking lug 62, for example. Second locking lug 63 is formed into a shape where a lower surface side of second locking lug 63 is recessed, and a locking projection (not shown in the drawing) is formed on a lower surface of second locking lug 63.

Second locking portion 67 is formed on the other side surface of ultrasonic flow rate measuring unit 9*a* and the other side surface of each flow passage member 10*a* in a sidewardly projecting manner. Second locking portion 67 includes third locking lug 68 and fourth locking lug 69. Second locking groove 70 is formed between third locking lug 68 and fourth locking lug 69. In the same manner as second locking lug 63, third locking lug 68 is formed into a shape where a lower surface side of third locking lug 68 is recessed, and a locking projection (not shown in the drawing) is formed on a lower surface of third locking lug 68. Also in the same manner as first locking lug 62, fourth locking lug 69 is formed into a shape where an upper surface side of fourth locking lug 69 is recessed, and second raised lug 71 is formed on a third locking lug 68 side of fourth locking lug 69. Second locking hole 72 is formed in a center portion of fourth locking lug 69, for example.

According to this exemplary embodiment, ultrasonic flow rate measuring unit 9*a* and flow passage member 10*a* positioned on an upper side and a lower side in the vertical direction are joined and fixed to each other in the vertical direction by making engaging pawl 58 of support leg 59 engage with engaging hole 60. In the same manner, flow passage members 10*a* positioned on an upper side and a lower side in the vertical direction are joined and fixed to each other in the vertical direction by making engaging pawl 58 of support leg 59 engage with engaging hole 60.

Further, ultrasonic flow rate measuring unit 9*a* and flow passage member 10*a* positioned on a left side and a right side in the lateral direction are fixed with each other by making first locking portion 61 and second locking portion 67 engage with each other. In the same manner, flow passage members 10*a* positioned on a left side and a right side in the lateral direction are also fixed with each other by making first locking portion 61 and second locking portion 67 engage with each other.

To be more specific, when first locking portion 61 and second locking portion 67 are engaged with each other, firstly, first raised lug 65 is inserted into second locking groove 70 and, at the same time, second raised lug 71 is inserted into first locking groove 64. Then, when the position of first locking portion 61 and the position of second locking portion 67 are aligned with each other, a locking projection of third locking lug 68 is engaged with first locking hole 66 formed in first locking lug 62. At the same time, a locking projection of second locking lug 63 is engaged with second locking hole 72 formed in the fourth locking lug.

With such a configuration, ultrasonic flow rate measuring unit 9*a* and flow passage members 10*a* are joined to each other thus formed into an integral body. As a result, handling of ultrasonic flow rate measuring unit 9*a* and flow passage members 10*a* is enhanced.

That is, with the above configuration, ultrasonic flow rate measuring unit 9*a* and flow passage member 10*a* are formed into an integral body thus formed into a unit. As a result, vibrations of ultrasonic flow rate measuring unit 9*a* are suppressed so that accuracy in measuring a flow rate is enhanced. Further, vibrations of ultrasonic flow rate measuring unit 9*a* and flow passage member 10*a* are suppressed so that the transmission of vibrations to outlet pipe 5 is also suppressed. Accordingly, the transmission of vibrations to the connecting portion between outlet pipe 5 and upper case 2 can be reduced. As a result, it is possible to suppress the deterioration of sealing property at the connecting portion between outlet pipe 5 and upper case 2 and hence, a gas flowmeter having high reliability can be implemented.

Sixth Exemplary Embodiment

Hereinafter, the configuration of a gas flowmeter of a sixth exemplary embodiment of the present invention is described with reference to FIG. 31 and FIG. 32. Parts having an identical configuration with the corresponding parts of the first to fifth exemplary embodiments are given the same symbols and the description of these parts is omitted.

Figure 31:
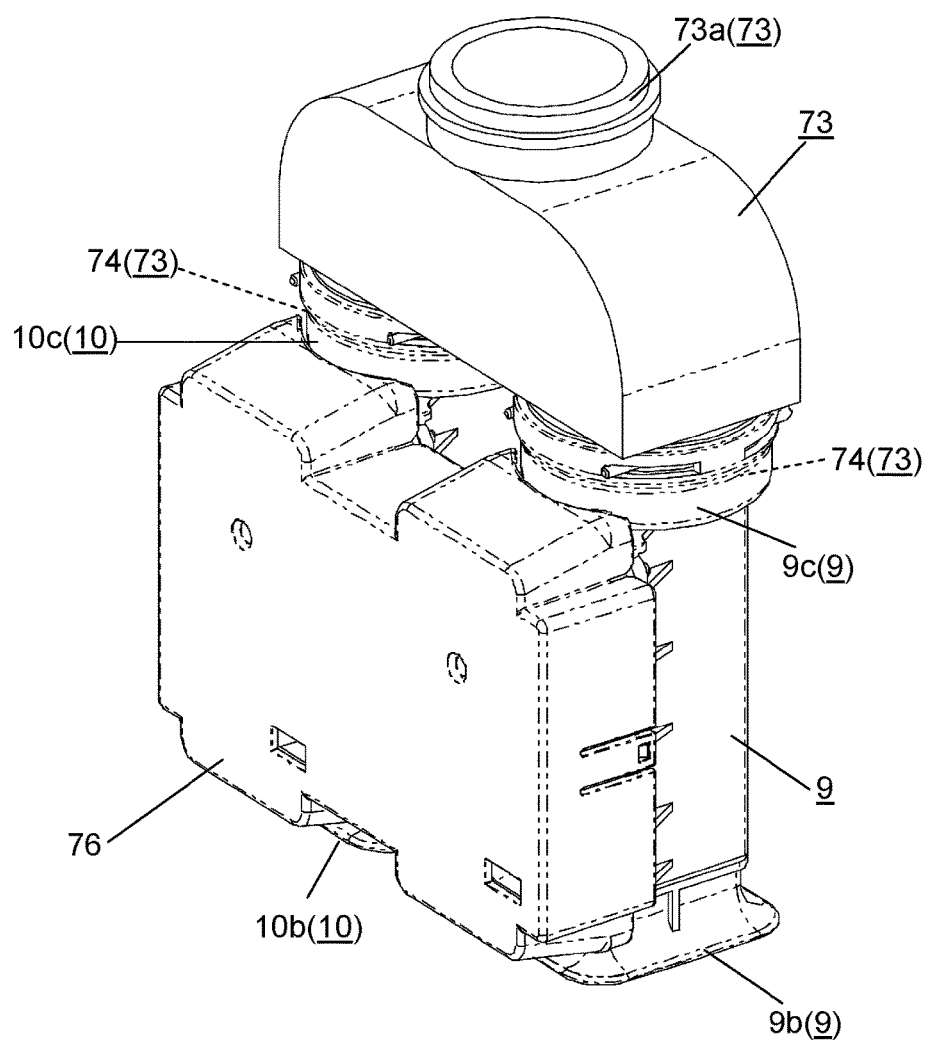
FIG. 31 is a perspective view of a main part for describing a gas flowmeter according to a sixth exemplary embodiment of the present invention.
Figure 32:
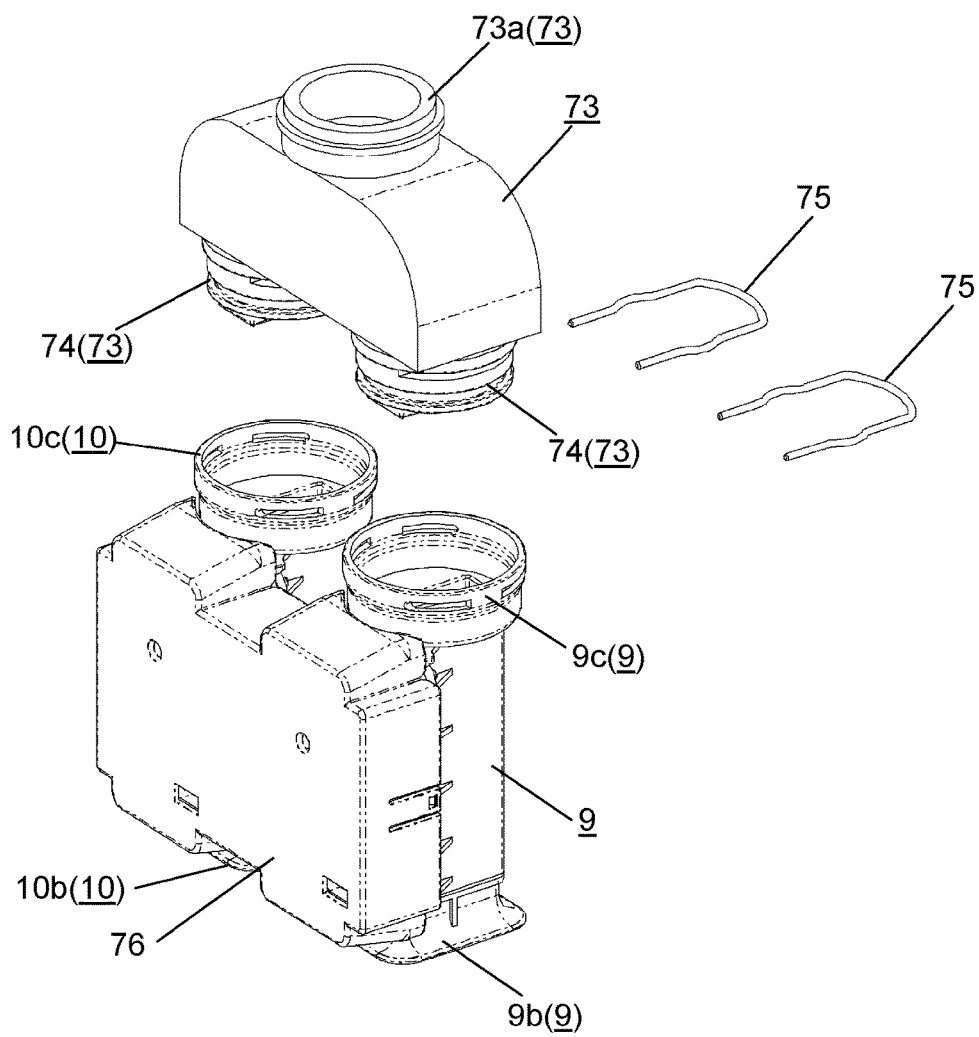
FIG. 32 is an exploded perspective view of the main part of the gas flowmeter.
Figure 33:
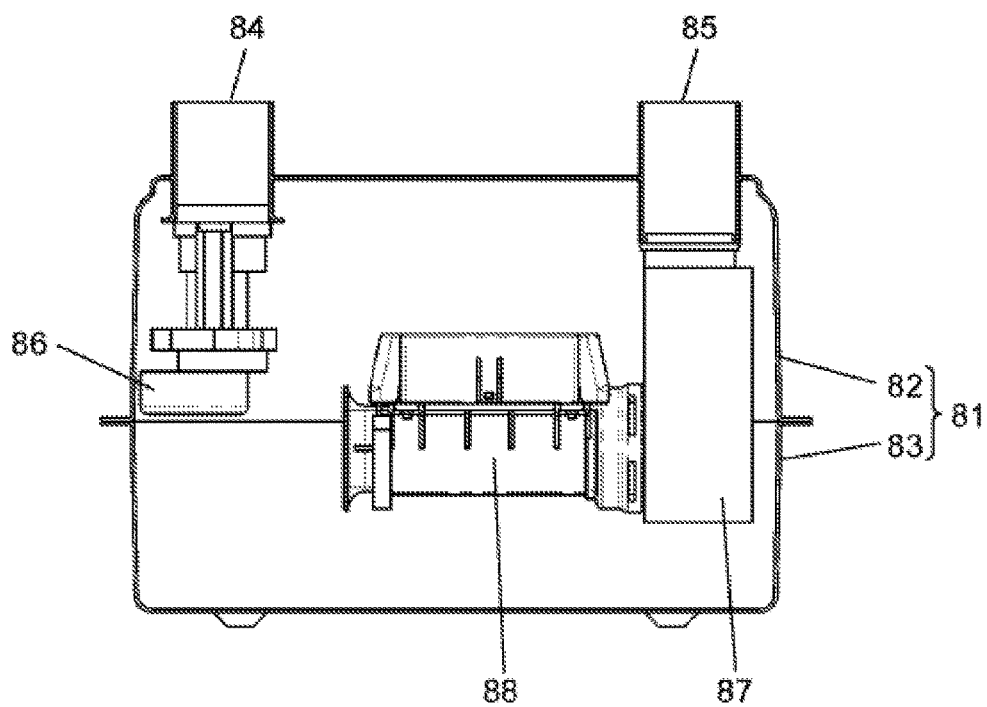
FIG. 33 is a view for describing a conventional gas flowmeter.

FIG. 31 is a perspective view of a main part for describing the gas flowmeter according to the sixth exemplary embodiment of the present invention. FIG. 32 is an exploded perspective view of the main part of the gas flowmeter.

The gas flowmeter of this exemplary embodiment differs from the gas flowmeters of the first exemplary embodiment and the second exemplary embodiment in that a pair of mounting portions 74 is formed on a lower surface of connecting pipe 73, and outflow port 9*c* of ultrasonic flow rate measuring unit 9 and outflow port 10*c* of flow passage member 10 are connected to the pair of mounting portions 74 respectively. In this exemplary embodiment, the description is made by taking the configuration where outflow port 9*c* of ultrasonic flow rate measuring unit 9 is connected to right mounting portion 74, and outflow port 10*c* of flow passage member 10 is connected to left mounting portion 74 shown in FIG. 31 and FIG. 32 as one example. Mounting portion 74 and outflow port 9*c* of ultrasonic flow rate measuring unit 9, and mounting portion 74 and outflow port 10*c* of flow passage member 10 are respectively fixed to each other by fixing fittings 75, for example.

With such a configuration, ultrasonic flow rate measuring unit 9 and flow passage member 10 are arranged such that an inflow port 9*b* side of ultrasonic flow rate measuring unit 9 and an inflow port 10*b* side of flow passage member 10 are directed downward. That is, in this exemplary embodiment, ultrasonic flow rate measuring unit 9 and flow passage member 10 are arranged below connecting pipe 73 so as to extend in the approximately vertical direction (including the vertical direction).

Ultrasonic flow rate measuring unit 9 and flow passage member 10 are joined to each other by support member 76 mounted on a side surface of ultrasonic flow rate measuring unit 9 and a side surface of flow passage member 10 thus formed into an integral body. Support member 76 protects a printed circuit board (not shown in the drawing) and the like mounted on the side surface of ultrasonic flow rate measuring unit 9 by covering.

That is, ultrasonic flow rate measuring unit 9 and flow passage member 10 are joined to each other by support member 76 thus formed into an integral body. With such a configuration, ultrasonic flow rate measuring unit 9 and flow passage member 10 can be handled as a unit. As a result, operability in mounting ultrasonic flow rate measuring unit 9 and flow passage member 10 on device body 1 is enhanced.

According to this exemplary embodiment, ultrasonic flow rate measuring unit 9 and flow passage member 10 are arranged so as to extend in the approximately vertical direction (including the vertical direction) at positions below outlet pipe 5 such that the inflow port 9b side and the inflow port 10b side are directed downward. With such a configuration, it is possible to suppress the generation of a moment in the rotation direction by ultrasonic flow rate measuring unit 9 and flow passage member 10 with respect to connecting pipe 73. Accordingly, vibrations of ultrasonic flow rate measuring unit 9 are suppressed and hence, the gas flowmeter can perform stable flow rate measurement.

According to this exemplary embodiment, ultrasonic flow rate measuring unit 9 and flow passage member 10 can be formed into an integral body in a state where ultrasonic flow rate measuring unit 9 and flow passage member 10 are connected to connecting pipe 73. Accordingly, swinging of ultrasonic flow rate measuring unit 9 can be further suppressed. Further, a stress applied to a connecting portion between outlet pipe 5 and upper case 2 can be reduced compared to a conventional gas flowmeter where outlet pipe 5 and upper case 2 are arranged in an L shape. As a result, it is possible to further lower a possibility of breakage of the connecting portion between outlet pipe 5 and upper case 2.

According to this exemplary embodiment, ultrasonic flow rate measuring unit 9 and flow passage member 10 having the identical flow passage shape are connected to mounting portions 74 of connecting pipe 73. With such a configuration, it is possible to make a flow rate in ultrasonic flow rate measuring unit 9 and a flow rate in flow passage member 10 substantially equal to each other (including equal to each other). Accordingly, even in the configuration where a flow rate in a gas flowmeter is largely increased by forming a plurality of mounting portions 74, it is possible to maintain high measuring accuracy of ultrasonic flow rate measuring unit 9.

According to this exemplary embodiment, even when vibrations are generated during transportation of a flowmeter or the like, large swinging of ultrasonic flow rate measuring unit 9 and flow passage member 10 can be suppressed. Accordingly, the deformation or the like in the connecting portion between outlet pipe 5 and upper case 2 can be suppressed. As a result, the deterioration of sealing property at the connecting portion between outlet pipe 5 and upper case 2 can be suppressed and hence, a flowmeter having high reliability can be implemented.

In this exemplary embodiment, the description has been made with respect to the example where ultrasonic flow rate measuring unit 9 is connected to right mounting portion 74 of connecting pipe 73, and flow passage member 10 is connected to left mounting portion 74. However, the present invention is not limited to such a configuration. For example, flow passage member 10 may be connected to right mounting portion 74 of connecting pipe 73, and ultrasonic flow rate measuring unit 9 may be connected to left mounting portion 74 of connecting pipe 73. In this case, an ultrasonic flow rate measuring unit having a mechanism of measuring a flow rate may be connected to both mounting portions 74 respectively. In this case, a measurement signal from one ultrasonic flow rate measuring unit 9 may be used for measuring a flow rate, and the other ultrasonic flow rate measuring unit may be used as flow passage member 10 instead of using the other ultrasonic flow rate measuring unit for measuring a flow rate.

As has been described above, the gas flowmeter according to the present invention includes: the device body which air-tightly accommodates a fluid to be measured; the inlet pipe through which the fluid to be measured is made to flow into the device body; and the outlet pipe through which the fluid to be measured is made to flow out from the device body. The gas flowmeter further includes: the connecting pipe which is connected to the outlet pipe; the ultrasonic flow rate measuring unit which is connected to the connecting pipe and measures a flow rate of the fluid to be measured which flows in the ultrasonic flow rate measuring unit; and the flow passage member which is connected to the connecting pipe and has the flow passage shape identical to a shape of the ultrasonic flow rate measuring unit. The gas flowmeter may also be provided with the support member by which the ultrasonic flow rate measuring unit and the flow passage member are joined to each other.

In the gas flowmeter of the present invention, the ultrasonic flow rate measuring unit and the flow passage member may be arranged longitudinally with respect to the connecting pipe.

In the gas flowmeter of the present invention, the ultrasonic flow rate measuring unit and the flow passage member may be arranged laterally with respect to the connecting pipe.

In the gas flowmeter of the present invention, at least one ultrasonic flow rate measuring unit and a plurality of the flow passage members may be provided, and the ultrasonic flow rate measuring unit and the plurality of the flow passage members may be arranged longitudinally and laterally with respect to the connecting pipe.

In the gas flowmeter of the present invention, an inflow port may be formed on a lower surface side of the connecting pipe, and the ultrasonic flow rate measuring unit and the flow passage member may be connected to the inflow port in a downwardly extending manner.

In the gas flowmeter of the present invention, an ultrasonic flow rate measuring unit may be used as the flow passage member.

In the gas flowmeter of the present invention, the support member may be supported by the device body.

With such a configuration, it is possible to suppress vibrations of the ultrasonic flow rate measuring unit by integrally joining the ultrasonic flow rate measuring unit and the flow passage member to each other. As a result, it is possible to implement a gas flowmeter which can perform flow rate measurement with high accuracy.

INDUSTRIAL APPLICABILITY

The present invention can suppress swinging including vibrations of the ultrasonic flow rate measuring unit and hence, the present invention is useful for an instrument such as a gas flowmeter which is required to perform flow rate measurement with high accuracy.

REFERENCE MARKS IN THE DRAWINGS 1, 81: device body
2, 82: upper case
3, 83: lower case
4, 84: inlet pipe
5, 85: outlet pipe
6, 86: cut-off valve
7, 24, 31, 40, 53, 73, 87: connecting pipe
7a, 24a, 31a, 40a, 54a, 54b, 56a: connecting portion
7b, 9d, 10d, 24b, 31b, 40b, 56b: side surface 8, 25, 32, 41, 55, 74: mounting portion
9, 9a, 88: ultrasonic flow rate measuring unit
9b, 10b: inflow port
9c, 10c: outflow port
10, 10a: flow passage member
11, 26, 33, 42, 76: support member
12, 43: upper support member
12a, 13a, 26a, 43a, 44a: recessed portion
12a1, 13a1, 26a1, 43a1, 44a1: upper surface
13, 44: lower support member
14, 19, 27, 39, 45, 48: fixing portion
15, 20: locking projection
16, 21, 28, 46, 49: locking pawl
17, 29, 47: support arm
18, 35: holding portion
22, 50, 60: engaging hole
23, 51, 58: engaging pawl
30, 52, 59: support leg
31c: lower surface
34: base portion
36: projection
37, 65, 71: raised lug
38: mounting hole
38a: elongated hole shaped portion
38b: circular hole shaped portion
39a: head portion
39b: leg portion
54: joint portion
56: connecting sleeve
57, 75: fixing fitting
61: first locking portion
62: first locking lug
63: second locking lug
64: first locking groove
66: first locking hole
67: second locking portion
68: third locking lug
69: fourth locking lug
70: second locking groove
72: second locking hole

The invention claimed is:

1. A gas flowmeter comprising:
a device body that air-tightly accommodates a fluid to be measured;
an inlet pipe through which the fluid to be measured flows into the device body;
an outlet pipe through which the fluid flows out from the device body;
a connecting pipe connected to the outlet pipe;
a cantilevered ultrasonic flow rate measuring unit connected to the connecting pipe at only a first end of the cantilevered ultrasonic flow rate measuring unit and having an open inflow port at a second end of the cantilevered ultrasonic flow rate measuring unit and configured to measure a flow rate of the fluid flowing therethrough; and
a cantilevered flow passage member connected to the connecting pipe at only a first end of the cantilevered flow passage member and having an open inflow port at a second end of the cantilevered flow passage member and having a flow passage shape identical to a shape of the ultrasonic flow rate measuring unit,
wherein the gas flowmeter includes a support member separate from the connecting pipe and joining the cantilevered ultrasonic flow rate measuring unit to the cantilevered flow passage member.

2. The gas flowmeter according to claim 1, wherein the cantilevered ultrasonic flow rate measuring unit and the cantilevered flow passage member reside longitudinally with respect to the connecting pipe.

3. The gas flowmeter according to claim 2, wherein the support member is supported by the device body.

4. The gas flowmeter according to claim 1, wherein the cantilevered ultrasonic flow rate measuring unit and cantilevered the flow passage member reside laterally with respect to the connecting pipe.

5. The gas flowmeter according to claim 4, wherein the support member is supported by the device body.

6. The gas flowmeter according to claim 1,
wherein at least one of the cantilevered ultrasonic flow rate measuring unit and a plurality of the cantilevered flow passage members are provided, wherein the at least cantilevered one ultrasonic flow rate measuring unit and the plurality of cantilevered flow passage members reside longitudinally and laterally with respect to the connecting pipe.

7. The gas flowmeter according to claim 6, wherein the support member is supported by the device body.

8. The gas flowmeter according to claim 1, wherein the support member is supported by the device body.

9. A gas flowmeter comprising:
a device body that air-tightly accommodates a fluid to be measured;
an inlet pipe through which the fluid to be measured flows into the device body;
an outlet pipe through which the fluid flows out from the device body;
a connecting pipe connected to the outlet pipe;
an ultrasonic flow rate measuring unit connected to the connecting pipe and configured to measure a flow rate of the fluid flowing therethrough; and
a flow passage member connected to the connecting pipe and having a flow passage shape identical to a shape of the ultrasonic flow rate measuring unit,
wherein the gas flowmeter includes a support member separate from the connecting pipe and joining the ultrasonic flow rate measuring unit and the flow passage member to each other,
and further comprising an inflow port on a lower surface side of the connecting pipe, and wherein the ultrasonic flow rate measuring unit and the flow passage member are connected to the inflow port in a downwardly extending manner.

10. A gas flowmeter comprising:
a device body that air-tightly accommodates a fluid to be measured;
an inlet pipe through which the fluid to be measured flows into the device body;
an outlet pipe through which the fluid flows out from the device body;
a connecting pipe connected to the outlet pipe;
a first cantilevered ultrasonic flow rate measuring unit connected to the connecting pipe at only a first end of the first cantilevered ultrasonic flow rate measuring unit and having an open inflow port at a second end of the first cantilevered ultrasonic flow rate measuring unit and configured to measure a flow rate of the fluid flowing therethrough; and
a second cantilevered ultrasonic flow rate measuring unit connected to the connecting pipe at only a first end of the second cantilevered ultrasonic flow rate measuring unit and having an open inflow port at a second end of the second cantilevered ultrasonic flow rate measuring unit and having a flow passage shape identical to a shape of the first ultrasonic flow rate measuring unit, wherein the gas flowmeter includes a support member separate from the connecting pipe and joining the first cantilevered ultrasonic flow rate measuring unit to the second cantilevered ultrasonic flow rate measuring unit.

11. The gas flowmeter according to claim 10, wherein the support member is supported by the device body.

* * * * *